US007549042B2

(12) United States Patent
Glaum et al.

(10) Patent No.: US 7,549,042 B2
(45) Date of Patent: Jun. 16, 2009

(54) APPLYING CUSTOM SOFTWARE IMAGE UPDATES TO NON-VOLATILE STORAGE IN A FAILSAFE MANNER

(75) Inventors: Jeffery D. Glaum, Redmond, WA (US); Scott R. Shell, Kirkland, WA (US); Andrew M. Rogers, Seattle, WA (US); Michael E. Markley, Redmond, WA (US); Sachin C. Patel, Bellevue, WA (US); Mark Scott Tonkelowitz, Seattle, WA (US); Mark Plagge, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 10/837,250

(22) Filed: May 1, 2004

(65) Prior Publication Data

US 2005/0132179 A1    Jun. 16, 2005

Related U.S. Application Data

(60) Provisional application No. 60/530,184, filed on Dec. 16, 2003.

(51) Int. Cl.
*G06F 9/24* (2006.01)
(52) U.S. Cl. .............................. 713/100; 713/1; 713/2
(58) Field of Classification Search ................. 713/1, 713/2, 100; 717/168, 169, 174, 175
See application file for complete search history.

(56) References Cited

U.S. PATENT DOCUMENTS

| 4,974,149 A | | 11/1990 | Valenti |
| 5,303,384 A | * | 4/1994 | Rodriguez et al. .......... 700/264 |
| 5,421,006 A | | 5/1995 | Jablon |
| 5,625,693 A | | 4/1997 | Rohatgi |
| 5,757,914 A | | 5/1998 | McManis |

(Continued)

FOREIGN PATENT DOCUMENTS

EP    0802480    10/1997

(Continued)

OTHER PUBLICATIONS

European Search Report in application EP 04029342 which corresponds to US Application.

(Continued)

*Primary Examiner*—Thomas Lee
*Assistant Examiner*—Paul B Yanchus, III
(74) *Attorney, Agent, or Firm*—Workman Nydegger

(57) ABSTRACT

Described is a system and method in which software updates in the form of self-contained, secure entities are applied to an embedded device's non-volatile storage in a failsafe manner. Various types of software updates may be applied, and updates may contain executable code and/or data. Following a reboot, an initial program loader determines an update mode, and if updating, boots to a special update loader. The update loader processes update packages to apply the updates. Kernel partition, system partition and reserve section updates may be updated with entire files or binary difference files, with failure handling mechanisms are provided for each type of update. Updates may be simulated before committing them. Updates may be relocated in memory as appropriate for a device.

25 Claims, 13 Drawing Sheets

U.S. PATENT DOCUMENTS

| | | | |
|---|---|---|---|
| 5,835,777 A | 11/1998 | Staelin | |
| 6,157,721 A | 12/2000 | Shear | |
| 6,243,468 B1 | 6/2001 | Pearce | |
| 6,327,652 B1 | 12/2001 | England | |
| 6,330,670 B1 | 12/2001 | England | |
| 6,381,742 B2 | 4/2002 | Forbes | |
| 6,483,746 B2 * | 11/2002 | Haraguchi et al. | 365/185.08 |
| 6,675,382 B1 * | 1/2004 | Foster | 717/177 |
| 6,681,390 B2 * | 1/2004 | Fiske | 717/173 |
| 6,697,948 B1 | 2/2004 | Rabin | |
| 6,725,205 B1 | 4/2004 | Weller | |
| 6,802,006 B1 | 10/2004 | Brodov | |
| 6,807,665 B2 | 10/2004 | Evans | |
| 6,820,130 B1 * | 11/2004 | Miyamoto | 709/235 |
| 6,832,373 B2 | 12/2004 | O'Neill | |
| 6,871,344 B2 | 3/2005 | Grier | |
| 6,912,591 B2 * | 6/2005 | Lash | 709/246 |
| 7,000,230 B1 | 2/2006 | Murray | |
| 7,072,807 B2 | 7/2006 | Brown | |
| 7,085,957 B2 * | 8/2006 | Sundareson et al. | 714/6 |
| 7,117,304 B2 | 10/2006 | Sohn | |
| 7,222,341 B2 | 5/2007 | Forbes | |
| 7,228,541 B2 | 6/2007 | Gupton | |
| 7,237,122 B2 | 6/2007 | Kadam et al. | |
| 7,249,174 B2 | 7/2007 | Srinivasa | |
| 7,263,699 B2 | 8/2007 | Jacquemot | |
| 7,346,435 B2 * | 3/2008 | Amendola et al. | 701/1 |
| 2001/0029605 A1 | 10/2001 | Forbes | |
| 2001/0044782 A1 | 11/2001 | Hughes | |
| 2002/0152394 A1 | 10/2002 | Kadoya | |
| 2003/0028766 A1 * | 2/2003 | Gass et al. | 713/164 |
| 2003/0046482 A1 | 3/2003 | Venkiteswaran | |
| 2003/0063896 A1 * | 4/2003 | Gonzalez Tovar et al. | 386/94 |
| 2003/0182563 A1 | 9/2003 | Liu | |
| 2003/0217358 A1 * | 11/2003 | Thurston et al. | 717/174 |
| 2004/0003266 A1 | 1/2004 | Moshir | |
| 2004/0015946 A1 | 1/2004 | Te'eni | |
| 2004/0015958 A1 | 1/2004 | Veil | |
| 2004/0060035 A1 | 3/2004 | Ustaris | |
| 2004/0098427 A1 * | 5/2004 | Peng | 707/205 |
| 2004/0250245 A1 * | 12/2004 | Rao et al. | 717/168 |
| 2004/0255291 A1 | 12/2004 | Sierer | |
| 2005/0132123 A1 | 6/2005 | Glaum | |
| 2005/0132179 A1 | 6/2005 | Glaum | |
| 2005/0132349 A1 | 6/2005 | Roberts | |
| 2005/0132350 A1 | 6/2005 | Markley | |
| 2005/0132356 A1 | 6/2005 | Cross | |
| 2005/0155031 A1 | 7/2005 | Wang | |
| 2005/0203968 A1 | 9/2005 | Dehghan | |
| 2006/0079254 A1 * | 4/2006 | Hogan | 455/466 |

FOREIGN PATENT DOCUMENTS

| | | |
|---|---|---|
| EP | 1164475 | 12/2001 |
| WO | WO99/26123 | 5/1999 |
| WO | WO0201332 | 1/2002 |
| WO | WO02103495 | 12/2002 |

OTHER PUBLICATIONS

Lymn, Brett; "Preventing the Unauthorised Binary" article, Copyright 2000-2002, Jan. 19, 2000 Updated Jun. 18, 2002 by Jay Fink.

Office Action dated Aug. 25, 2008 cited in U.S. Appl. No. 10/837,150.

Anonymous: "Method for Generating Ordered build Dependencies" IBM Technical Disclosure Bulletin, vol. 38, No. 9, Sep. 1, 1995, pp. 161-162.

Ottenstien et al., "The Program Dependence Graph in a Software Development Environment", ACM 1984 p. 177-184.

Mark Alan Weiss, "Data Structures & Algorithim Analysis in C++" Second Edition, Published by Addison Wesley, 1999, pp. 339-346, Section 9.3.2 Dijkstra's Algorithim.

Office Action dated Nov. 14, 2007 cited in related U.S. Appl. No. 10/837,176.

Office Action dated Nov. 18, 2007 cited in related U.S. Appl. No. 10/837,024.

Advisory Action dated Feb. 20, 2008 cited in related U.S. Appl. No. 10/837,176.

Notice of Allowance dated Apr. 18, 2008 cited in related U.S. Appl. No. 10/837,024.

Office Action dated Jun. 9, 2008 cited in related U.S. Appl. No. 10/837,176.

Office Action dated Nov. 23, 2007 cited in related U.S. Appl. No. 10/837,150.

Office Action dated Jun. 25, 2007 cited in related U.S. Appl. No. 10/837,024.

Office Action dated Jun. 23, 2006 cited in related U.S. Appl. No. 10/837,151.

Office Action dated Dec. 9, 2008 cited in U.S. Appl. No. 10/837,151.

Office Action dated Jan. 7, 2009 cited in U.S. Appl. No. 10/837,250.

* cited by examiner

US 7,549,042 B2

APPLYING CUSTOM SOFTWARE IMAGE UPDATES TO NON-VOLATILE STORAGE IN A FAILSAFE MANNER

CROSS-REFERENCE TO RELATED APPLICATIONS

The present invention claims priority to U.S. provisional patent application Ser. No. 60/530,184 filed Dec. 16, 2003, and incorporated herein in its entirety.

The present invention is related to the following U.S. patent applications, filed concurrently herewith and incorporated herein in their entireties:

U.S. Ser. No. 10/837,176 "Determining the Maximal Set of Dependent Software Updates Valid for Installation"

U.S. Ser. No. 10/837,151 "Ensuring that a Software Update may be Installed or Run only on a Specific Device or Class of Devices;"

U.S. Ser. No. 10/837,024 "Self-Describing Software Image Update Components" and

U.S. Ser. No. 10/837,150 "Creating File Systems Within a File In a Storage Technology-Abstracted Manner."

FIELD OF THE INVENTION

The invention relates generally to computing devices, and more particularly to updating non-volatile storage of computing devices.

BACKGROUND

Mobile computing devices such as personal digital assistants, contemporary mobile telephones, and hand-held and pocket-sized computers are becoming important and popular user tools. In general, they have become small enough to be extremely convenient, while consuming less battery power, and at the same time have become capable of running more powerful applications.

During the process of manufacturing such devices, embedded operating system images are typically built into a monolithic image file and stored in non-volatile storage (e.g., NAND or NOR flash memory, a hard disk and so forth) of each device. As a result, updating such a device heretofore was a fairly complex and resource-intensive problem, generally requiring a custom solution.

For example, updating such a device typically involves downloading an entirely new monolithic image file comprising a single static image developed and released to run on a collection of devices. As can be readily appreciated, a significant amount of system resources (e.g., storage for temporarily holding the update image, network bandwidth for receiving the entire image file, and so forth) are required, regardless of what changed, and thus the device update process usually necessitates a one-off custom solution.

What is needed is a better way to update the non-volatile storage of computing devices that is more flexible, dynamic and efficient than current update mechanisms, yet is failsafe.

SUMMARY OF THE INVENTION

Briefly, the present invention is directed towards a system and method that applies software updates in the form of self-contained, secure entities to an embedded device's non-volatile storage in a failsafe manner. Various types of software updates may be applied, including updates that may contain only the changes to a previous update. Further, software updates may contain both executable code and data.

In one implementation, following a reboot, an initial program loader determines when an update has been requested or is in progress, and if so, boots to an update loader instead of normal operating system code. The update loader operates to validate any pending updates for applying the updates to flash (or other storage media) as appropriate. For security and control, the update loader is the only entity in the system to having write access to protected storage (e.g., an NK partition and a system partition). It should be noted that the update application also has write access to reserved regions in flash.

To update, update packages (which may be in various forms are downloaded to the system, and validated by a package validation process, which includes checking that each package is properly signed for security reasons, and that the packages in general are properly constructed. If valid, updates are queued, and a flag is set for the initial program loader to detect that an update is desired. The device is then rebooted.

Following reboot, the initial program loader sees that the update flag is set, and causes the update loader to run, for example by uncompressing the update loader (if compressed) into RAM and jumping to the update loader code. Beginning with the kernel package (if one exists), for each package, the update loader processes the package, revalidates them, fixes-up the files as necessary in a RAM section based on flash memory considerations, and writes the files into their corresponding partition. Note that the initial program loader leaves the flash unlocked so that it can be written to by the update loader.

To interpret the package contents, each package contains a device manifest file that has detailed information about the package, and the update loader reads the contents, including a globally-unique ID for package identification, a package version, dependency information relative to other packages, various settings, and a list of files and file versions included in the package. The manifest file is included in the package, thereby making the package self-describing, and is ultimately stored on the device following installation. A collection of manifest files on the device comprise a database of the packages' install state on the device, which can be enumerated.

The update loader handles compressed and non-compressed images, by retrieving various information about the image from the partition/image, and decompressing the image into RAM. If not compressed, the information is simply read, e.g., via prior knowledge of where a master boot record lives which provides the location of the active partition being updated.

In one implementation, any kernel updates are applied first in a failsafe manner, essentially by backing up the existing kernel by reading it into RAM and compressing it into a user store. The update is to the partition as a whole, and if successful the backed up kernel is deleted, while if unsuccessful the backed up kernel is decompressed and restored.

The system partition is generally larger than the kernel partition and as such, is typically too large to back up for failsafe-related reasons. Instead, an IMGFS file system is used to apply updates to individual modules and files, one at a time. The individual modules and files may be too large to do as a whole, and thus the updates may be applied via smaller blocks.

The IMGFS may first simulate the update process, requiring two passes through the process, namely a first pass in which IMGFS and the update application will not commit anything to flash. If the simulation succeeds, then a second pass is run to actually commit the changes. If the simulation fails, the simulation may be retried after re-running the package validator, and pass in a list of packages excluding the package that failed. The simulation will then run again with the new list that package validator returns. The simulations are retried until either a simulation succeeds or there are not any packages that can be applied. This guards against data corruption that may have occurred in the package that was signed despite the corruption.

When iterating through the modules in IMGFS using the existing device manifest file, the process checks to see if the file appears in the new device manifest file for the package. If not, the file is deleted from the IMGFS partition and the process continues with the next file. If so, new module flags are obtained from new device manifest file, and module headers loaded into the module structure.

To perform the update, the update application process loops through each of the packages in a nested loop to process each file in the package individually. If power is lost during this process, then a log file will tell exactly which package and which file in the package the process left off with, where the update can resume when power is restored. Part of the above processing includes (for executable code) updating the virtual address allocation for update modules.

Updates may be in canonical form or binary difference (delta) form. Non-modules do not require virtual address fix-ups and can be written to storage once the binary update is performed. If the file is a module, then each section is processed one at a time; each section is written to a new stream (where "stream" is a file system concept that is part of IMGFS). If the file is a regular data file, the data is written to the default stream.

If the module is a canonical update, each of the sections in the module are processed, including relocating an entire section to the address allocated by the virtual allocator and writing the entire section as a new stream in the new IMGFS file. The old module is updated in-place with old storage blocks being deallocated as new blocks are written. In the canonical case, recovery for a power failure is performed by obtaining the size of the each stream in the new file that has been written out and compare it to size of that section in the canonical file. If a stream in the new file is smaller than the canonical file, then that is where the process left off and can resume copying over the data.

In the binary difference case, a patching process is performed on one block at a time, where a block may equal the page/sector size. This is because there may not be enough flash space to keep both an old version and new version of a section around. As new blocks are created, old blocks can be deallocated as they are no longer needed. For a binary difference update, a sparse stream is created in the new module file for this section, and the old section is read into RAM. The entire old section is relocated back to the original base address. For each new block in the binary difference file, a new block is built based on binary difference commands and the new block is relocated to the address allocated by the virtual address allocator and written out to the sparse stream. Any old blocks from the old file stream that are no longer needed are deallocated.

In the bindiff case, a power failure is handled by narrowing down which section was left off with by comparing the stream size with that specified in the header. Once the section is determined, the patch returns the next block in the order and a check is made as to whether that block has been committed. If the block has already been committed, a verification is performed to check that the appropriate old blocks have already been decommitted. Once the block that was left off with is found, (that is, one that has not been committed yet), the process continues as normal.

For updating reserved memory sections, a reserve section update (e.g., outside of a partition) is accomplished in a similar manner to that of kernel partition updates, using the same update components. Each reserve-related package update is processed, by processing each file in the package, and determining whether the file is a binary difference module. If not, the file data is simply read and written from the file to the reserved region. If a binary difference module, then the existing region is read (e.g., into RAM) and the binary difference applied thereto before writing the updated data back to the reserved region.

Other advantages will become apparent from the following detailed description when taken in conjunction with the drawings, in which:

DETAILED DESCRIPTION

Exemplary Operating Environment

Figure 1:
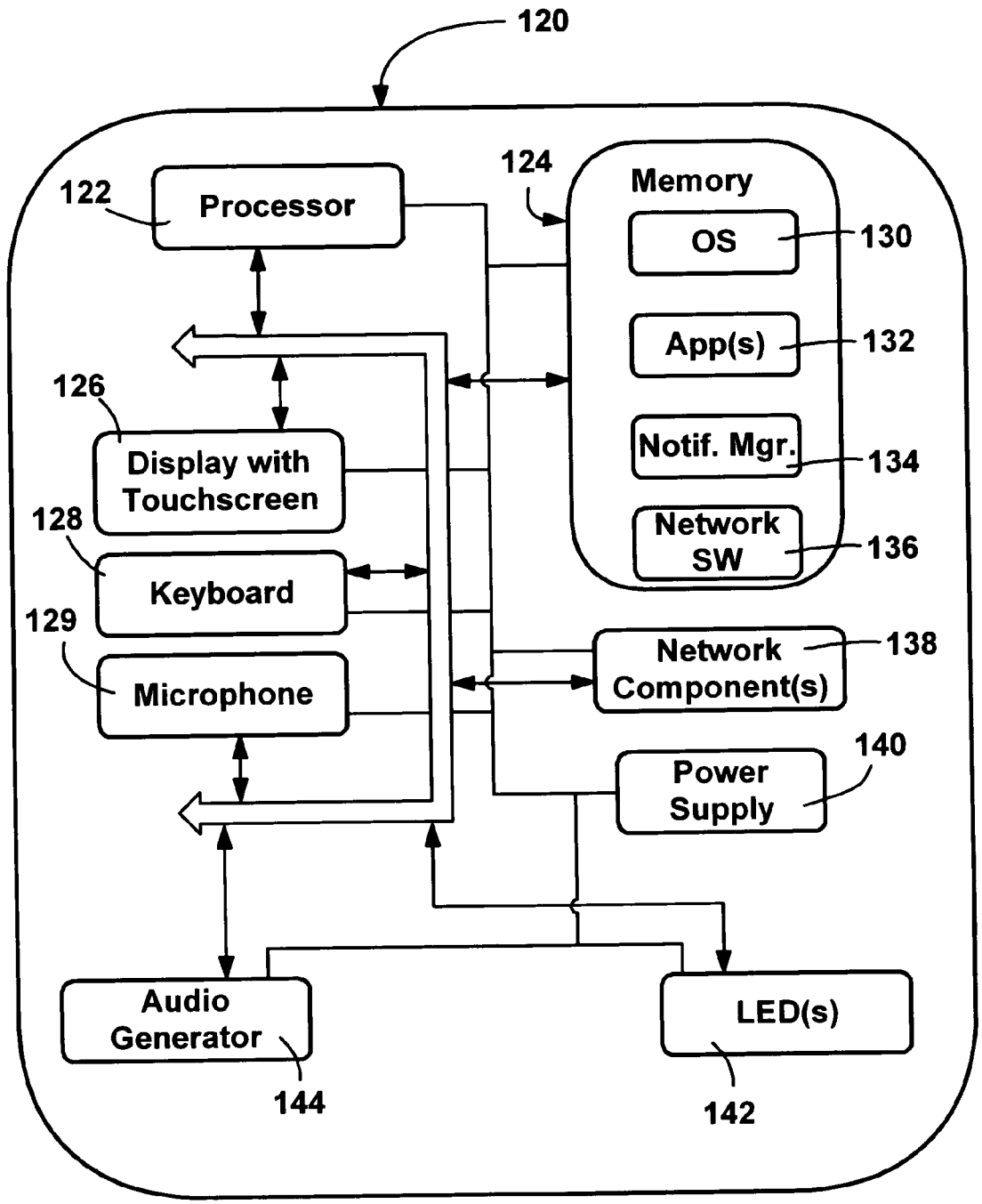
FIG. 1 is a block diagram generally representing a computer system into which the present invention may be incorporated.

FIG. 1 shows functional components of one such handheld computing device 120, including a processor 122, a memory 124, a display 126, and a keyboard 128 (which may be a physical or virtual keyboard, or may represent both). A microphone 129 may be present to receive audio input. The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® operating system from Microsoft Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132. Also, as described below, the handheld personal computer 120 includes networking software 136 (e.g., hardware drivers and the like) and network components 138 (e.g., a radio and antenna) suitable for connecting the handheld personal computer 120 to a network, which may include making a telephone call.

The handheld personal computer 120 has a power supply 140, which is implemented as one or more batteries. The power supply 140 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 142 and an audio generator 144. These devices may be directly coupled to the power supply 140 so that when activated, they remain on for a duration dictated by a notification mechanism even though the handheld personal computer processor 122 and other components might shut down to conserve battery power. The LED 142 preferably remains on indefinitely until the user takes action. Note that contemporary versions of the audio generator 144 use too much power for today's handheld personal computer batteries, and so it is configured to turn off when the rest of the system does or at some finite duration after activation.

Note that although a basic handheld personal computer has been shown, virtually any device capable of receiving data communications and processing the data in some way for use by a program, such as a mobile telephone, is equivalent for purposes of implementing the present invention.

Failsafe Applying of Custom Software Image Updates

The present invention is generally directed towards installing and/or updating software that is stored on small mobile computing devices, such as Microsoft Windows° CE .NET-based portable devices, including those in which the initial software or software update is written to the embedded device's non-volatile memory, e.g., flash memory. Notwithstanding, the present invention provides benefits to computing in general, and thus may apply to other computing devices and other types of storage, including various types of memory and/or other types of storage media such as hard disk drives. For purposes of simplicity, the term "flash" hereinafter will be used with reference to the updatable storage of a device, although it is understood that any storage mechanism is equivalent. Further, the term "image" will generally include the concept of the initial software installation image as well as subsequent software updates to an image, even when only part of an existing image is updated.

In accordance with an aspect of the present invention, software updates in the form of self-contained, secure entities are applied to an embedded device's non-volatile storage in a failsafe manner. Various types of software updates may be applied, including updates that may contain only the changes to a previous update. Further, software updates may contain both executable code and data. As will be understood, the executable code is customized to the virtual address space environment of the embedded device at install time. In keeping with the present invention, the software updates are installed in a failsafe manner, and allow for both roll-forward and roll-back recovery options depending on the stage of the update.

The following tables provide general, non-limiting definitions for some of the terms and file types described herein:

Terms

| Term | General Definition |
| --- | --- |
| Module | A single executable file (.EXE, .DLL, etc.) |
| Settings | A collection of configuration information that may contain Registry settings, file system initialization instructions (.DAT file), Database initializations, and Provisioning XML. |
| Component | A collection of modules, files (non-module files including templates, fonts, etc.), and settings that make up a feature unit. Components are typically associated with sysgen MODULES tags. |
| Package | A collection of components that is signed and packaged for distribution |
| Manifest | A file which describes the contents of a package. In the build environment, there is a package manifest file with the .BIB extension which contains entries which describe the names of each file in the package, but that's it. The device side manifest is a binary file which describes all of the information about a package (see Device Side Manifest file below). |
| Shadow Order Tool | Build tool which processes the Component Relationships File and generates the Package Shadow Files. |

File Types

| Exten. | File Type | General Description |
| --- | --- | --- |
| .pkd.xml | Package Definition File | XML file in the build tree which defines what packages exist (package name, GUID, version, loc buddy) |
| .cpm.csv | Component to Package Mapping file | CSV file in the build tree which maps MODULES tags and files to packages |
| .crf.csv | Component Relationships File | text file in the build tree which defines the relationships (shadow and dependency) between MODULES tags |
| .psf | Package Shadow File | Intermediate file in the build environment (one per package, as in <packagename>.psf) which lists all packages that must be shadowed by the named package. |
| .dsm | Device Side Manifest file | File on the device (one per package) which describes the package (files in the package, name, GUID, signature, version, shadows, dependencies, CRC, root certs, etc.) |
| .pkg.cab | Canonical Package file | Full version of a package which contains the complete file for all files in the package. |
| .pku.cab | Update Package file | A file which facilitates the update of a device from a specific version of a single package to a different version of the same package. This file may contain binary diffs of individual files, or complete files, whichever minimizes the size of the update package. |
| .pks.cab | Super Package file | A file which contains a collection of Update Packages and/or Canonical Packages. |

As also described in the aforementioned related U.S. patent application entitled, "Creating File Systems Within a File In a Storage Technology-Abstracted Manner," an initial image can be built from component parts (including packages, described below) and installed on a device in a customized manner during manufacturing process. The image is built with separate partitions, generally represented in FIG. 2, and can be updated in parts as described below, rather than requiring replacement of the monolithic image.

The partitioning scheme facilities the reliable updating of software on future embedded devices as well as those that already exist. Rather than generating a single static image during the software development and release process that is meant to run on a collection of devices, the present invention provides a more dynamic image update mechanism that facilitates better componentization of the updateable image, while being failsafe. To this end, the present invention provides a more flexible mechanism for breaking the operating system image into separate updateable components that can be updated in isolation, while maintaining any cross-component dependencies. To support this concept, the initial operating system image is constructed with certain key architectural features.

Figure 2:
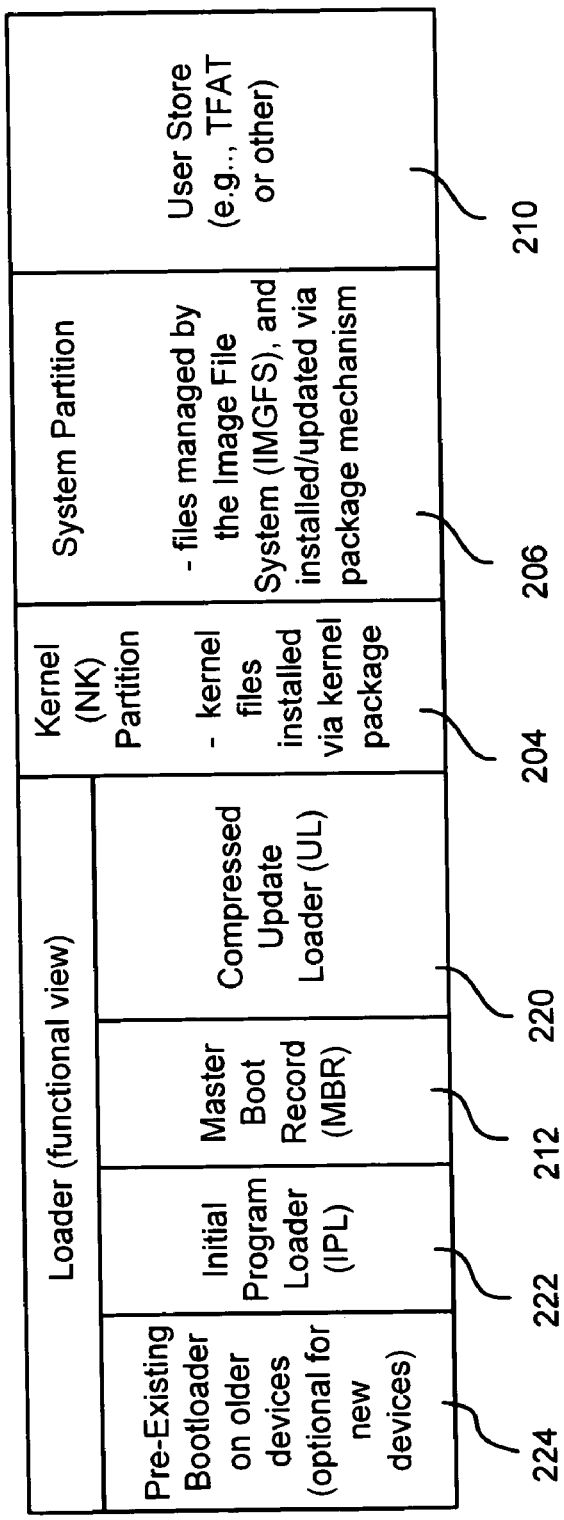
FIG. 2 is a block diagram representing a partitioned operating system image and loader components for facilitating failsafe component updates, in accordance with an aspect of the present invention.

FIG. 2 shows an example partitioning scheme for an operating system image 202 installed on flash and/or on other suitable non-volatile storage media. A kernel partition 204 is provided as a restricted/protected partition for the purpose of storing a kernel image. The Kernel/NK partition provides storage for the core pieces of the operating system image (kernel, file system, and so forth), and contains code to be executed during the boot-up process. A restricted/protected system partition 206 is provided for storing the system components application and other parts of the operating system image (drivers, applications, data files, and so forth). The contents of these partitions 204 and 206 are managed by file system drivers that abstract the physical mapping of storage, and also serve to support transacted updates of components in the system partition 206, thus enabling a failsafe/recovery solution in keeping with the present invention, as described below. Access to the contents of the protected kernel partition is controlled via a binary file system (BINFS), while access to the contents of the protected system partition is controlled via an image file system (IMGFS).

Also represented in FIG. 2 (although not actually part of the operating system image 202) is a userstore partition 210, which the system/user may use as needed, and essentially may be any file system format, (e.g., TFAT). As described below, among other potential uses, this partition may be used for temporarily storing some of the packages to be installed during an update procedure. Note that a master boot record is written to define the partitions, e.g., their offsets/sizes.

FIG. 2 also provides a functional view of the loader environment. In general, the loader is responsible for bootstrapping the embedded system to the point that a decision can be made (by an initial program loader 222, which may work in conjunction with a pre-existing boot loader 224 if present) as to whether a normal operating system boot or an update boot will occur. Note that a "pre-existing" bootloader is not necessary for new devices, however a device manufacturer may optionally decide that it should be present.

For update boots, part of the loader comprises an update loader (the UL 220) which serves as a gatekeeper of any flash updates. The update loader 220 is responsible for validating any pending updates and then once validated, for applying the updates to flash as appropriate. For security and control, the update loader 220 is the only entity in the system to having write access to protected storage (e.g., the NK partition and the system partition) and thus provides a single point responsible for protecting the integrity of the system's storage. Note that the update loader is relatively large and used only when applying updates, and thus in one implementation is stored in a compressed form and uncompressed into RAM when needed.

Figure 3:
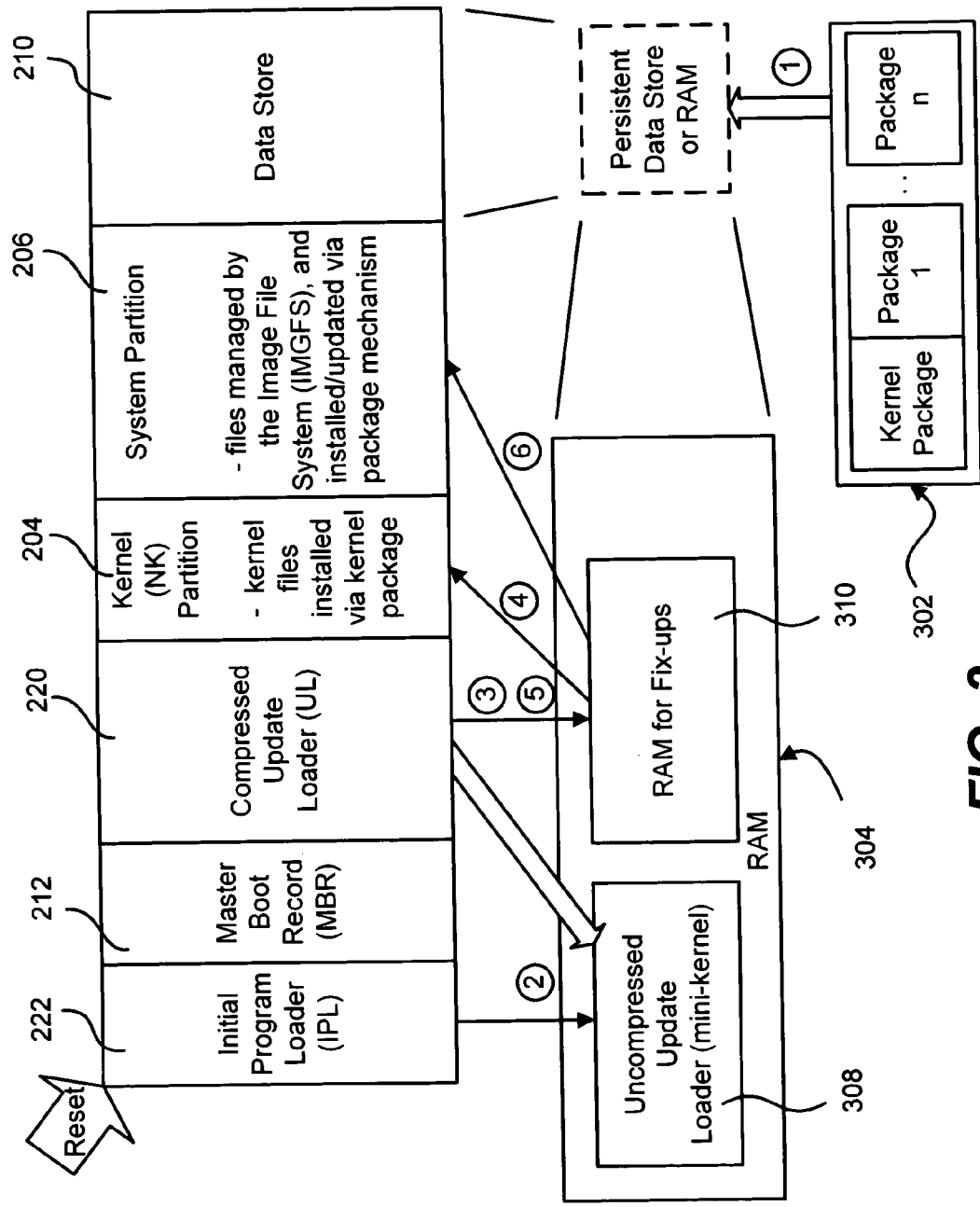
FIG. 3 is a block diagram representing applying an update package to a device's storage, in accordance with an aspect of the present invention.

FIG. 3 represents an update installation mechanism/process. Note that FIG. 3 starts from the perspective of an update, after the device has been previously initially populated (e.g., via a JTAG interface or a gang programmer during manufacturing) with the initial program loader, master boot record (MBR) and update loader (UL) components. Also, canonical packages, (described below) are applied from the persistent store/RAM into the kernel and system partitions.

In FIG. 3, update packages 302 (which may be canonical, delta update or super packages, as described below) are downloaded to system RAM 304 and/or the user data store 210, possibly manually or automatically with a notification given to the device user that updates are available. This is generally represented in FIG. 3 by the arrow labeled with circled numeral one (1).

Thus, once the initial manufacturing image is installed on a device, future updates to the image are done by updating discrete parts of the image that are encapsulated into packages. In general, a package is a self-describing collection of image files (code, data, scripts and so forth), and in one implementation comprises a collection of components that is signed and packaged for distribution. Packages provide a means for the operating system image software files to be broken up into smaller functional groupings of files. In one implementation, the entire operating system image is comprised of one or more packages (exclusive of the loader components) and can then be treated simply as a sum of smaller packages which are managed, built, and updated individually, each of which may be updated individually or in combination with other packages, depending upon each package's requirements. Thus, in keeping with the present invention, image updates no longer have to be done as an entire operating system image region.

Packages may be configured in various ways, including "canonical," "delta/difference," and "super" forms, that each serve various purposes with respect to software updates. For example, canonical packages contain a complete copy of each file within the package, while delta/difference packages contain one or more files which contain only the binary differences based on an earlier revision of the file. Delta/difference packages are typically smaller in size relative to other packages, and are thus used when trying to optimize download cost and download time. Super packages contain other packages, and are used as a convenience when it is needed to download more than one package (e.g., such as with interdependent packages). In one implementation, package files are Win32 CAB files that contain a manifest file (described below) and the files that define the package, e.g., those to be installed.

Canonical packages are generated during the build process by associating operating system features and metadata (e.g., a specific application's executable code and all associated data and configuration information) with a package definition. Delta/difference packages are generated from canonical packages by applying a binary difference algorithm to the contents of two canonical packages and capturing the dependent relationship that the delta/difference package has on the baseline canonical package version. Once the operating system image features and metadata are mapped to individual packages, each package is created, as generally described in the aforementioned U.S. patent application "Self-Describing Software Image Update Components" by using packaging tools to enumerate the contents of the package and by processing executable files (with a relocation tool called RelMerge) to enable them to be updated in the future for memory-related fix-ups.

When the user initiates an update process, a package validator verifies the package, as described in the aforementioned related patent applications entitled "Determining the Maximal Set of Dependent Software Updates Valid for Installation" and "Ensuring that a Software Update may only be Installed or Run on a Specific Device or Class of Devices." If validated, the system sets an update flag in flash, and reboots. Note that as described below, the update flag is persisted, so that once the update loader code starts the device will reenter the update mode in the event power is lost.

Following reboot, the initial program loader 222 sees that the update flag is set, and uncompresses the compressed update loader into the RAM 304, as represented in FIG. 3 via the uncompressed update loader code 308, and passes control to the update loader code 308. This is generally represented in FIG. 3 by the arrow labeled with circled numeral two (2). Note that when the update loader launches the update application, the update application re-runs the validation process using a list of files, or a set of directory specifications, that was set by the updatebin.exe application before the device rebooted. The validation process is re-run to guard against malicious replacement of packages.

Beginning with the kernel package, if any, for each package, the update loader processes the package, fixes-up the files as necessary in a RAM section 310 based on flash memory considerations, and writes the files into their corresponding partition using BINFS services, as generally shown in FIG. 3 via the arrows labeled three (3) through six (6). Fixups are generally described below and also in the aforementioned related patent application entitled "Self-Describing Software Image Update Components."

Figure 4:
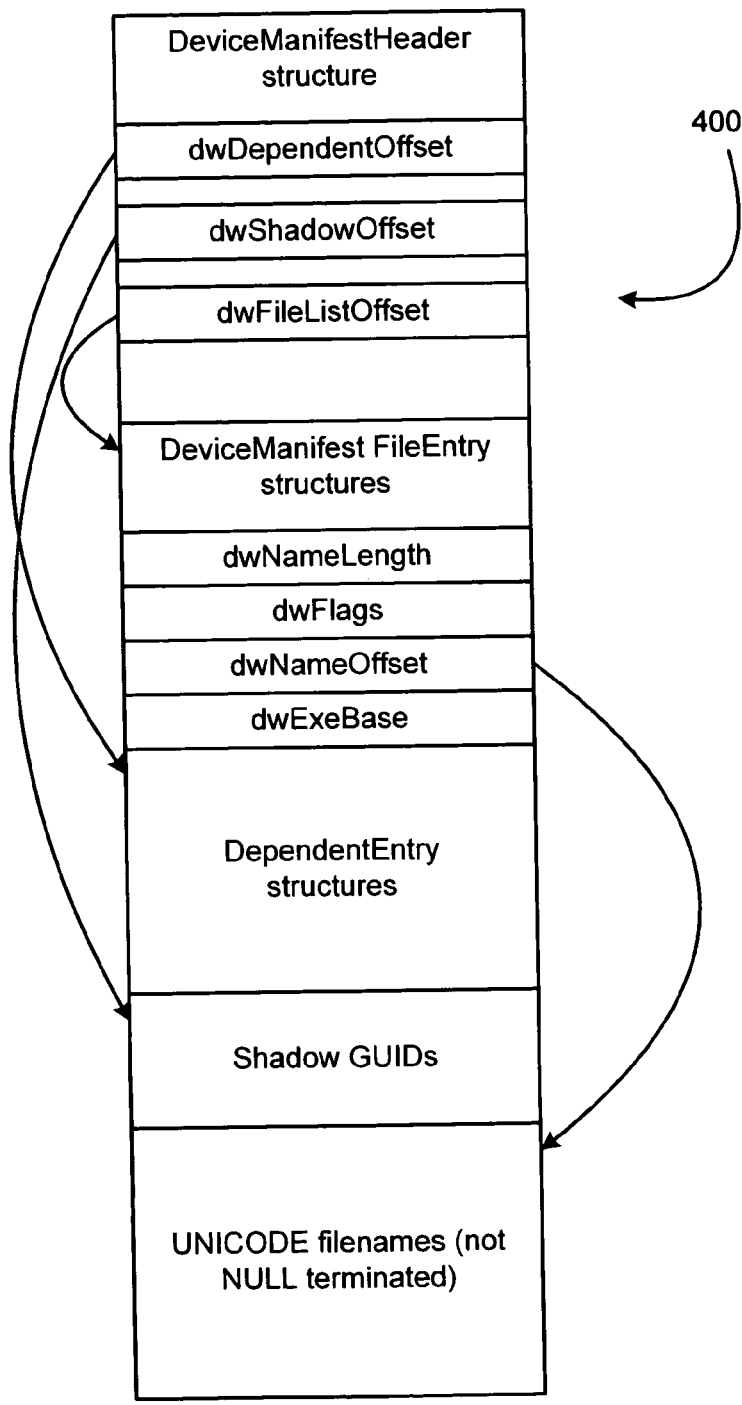
FIG. 4 is a block diagram representing the format of a device manifest file that describes a package, in accordance with an aspect of the present invention.

Each package contains a device manifest file 400 that contains detailed information about the package, as generally represented in FIG. 4. Manifest files are essentially specification files for each package, and contain information such as a globally-unique ID for package identification, a package version, dependency information relative to other packages, settings, a list of files and file versions included in the package and other shared common characteristics. The manifest file 400 is included in the package, thereby making the package self-describing, is reviewed during the install process and ultimately stored on the device. A collection of manifest files on the device comprise a database of package install state on the device which can be enumerated.

In one implementation corresponding to the format and information contained in the device manifest file shown in FIG. 4, the device manifest file is also described with this structure definition:

```
typedef struct __DeviceManifestHeader
{
    const DWORD dwStructSize;           // Size of this structure (in bytes)
                                        // for versioning
    const DWORD dwPackageVersion;       // Version of this package
    const DWORD dwPrevPkgVersion;       // Version of package that this package
                                        // updates. (0) for Canonical
    const DWORD dwPackageFlags;         // package specific identifiers.
    const DWORD dwProcessorID;          // what processor (matches defines in
                                        // winnt.h)
    const DWORD dwOSVersion;            // what version of the operating system
                                        // was this built to.
    const DWORD dwPlatformID;           // what was the target platform.
    const DWORD dwNameLength;           // length of filename in bytes.
    const DWORD dwNameOffset;           // offset to Friendly name of package
    const DWORD dwDependentCount;       // How many entries in Dependent GUID
                                        // list.
    const DWORD dwDependentOffset;      // How many bytes from the front of the
                                        // file are the dependent GUID structs.
    const DWORD dwShadowCount;          // How many entries in shadow GUID list.
    const DWORD dwShadowOffset;         // How many bytes from front of file is
                                        // the array of shadowed package GUIDs.
    const DWORD dwFileCount;            // How many files are there listed in
                                        // this manifest.
    const DWORD dwFileListOffset;       // How many bytes from the front of file
                                        // to the first FileEntry.
    const DWORD cbCERTData;             // number of bytes of digital certificate
                                        // data
    const DWORD dwCERTDataOffset;       // How many bytes from the front of file
                                        // to the certificate data.
    const GUID guidPackage;             // GUID of this package
}DeviceManifestHeader, *PDeviceManifestHeader;
typedef struct __DependentEntry {
    const DWORD size;
    const DWORD version;
    const GUID guid;
}DependentEntry,*PDependentEntry;
typedef struct __FileEntry {
    const DWORD dwNameLength;
    const DWORD dwFlags;
    const DWORD dwOffset;
    const DWORD dwBase; // Base address this file was originally linked with.
}FILEENTRY,*PFILEENTRY;
```

Each package that is created is signed for security reasons and is then ready for download/install. The package generation process/package generator, as described in the aforementioned related U.S. patent application entitled, "Self-Describing Software Image Update Components," automates the creation of package files that contain full versions of the files that are defined by package description files. In general, the package generator inputs a package definition file (e.g., specified by a command line argument; other input files are determined based on the contents of the specified package definition file. The package generator parses the package definition file (e.g., comprising one or more package definitions, each package being encoded as an XML document entry) and may parse a package shadow file that contains data related to the precedence ordering relative to other packages for settings such as registry settings. Further, the package generator parses a build manifest file to find each file specified therein and then determine the type of the file. For executable file types, the package generator calls a process (RelMerge) that performs relocation-related operations as well as performing formatting (e.g., to convert an executable to a Windows® CE file format).

In one implementation, the package generator comprises an application program that uses .NET class libraries named e.g., PkgCommon. The package generator application creates multiple subdirectories with the number of subdirectories that are created being equal to the number of valid packages found in the package collection file specified on the command line. Each package has a unique subdirectory created for it during the package generation process. In addition, the package generator will create additional files in each subdirectory using information found within a package definition. For each package, a Device Manifest File is created, with the name for the Device Manifest File derived from the GUID for the package. For each valid package definition, a package file is created to contain the files that comprise the package, including the device manifest file. These Package files conform to the Microsoft CAB file Version 1.3 format.

The installation process makes heavy use of the contents of the device manifest file, both for those packages already installed on the device as well as for those packages queued for potential install on the device. The package information API was designed to provide an abstracted means of querying package information and is used on both the device and on the build host. The API is detailed in the aforementioned related patent application entitled "Determining the Maximal Set of Dependent Software Updates Valid for Installation."

Updates to the kernel or system partitions are managed and delivered to the device using the package mechanism. Packages are transported to the device, stored in temporary storage, and are queued for installation via any suitable means, e.g., by components of the existing operating system image. Any suitable transport means (physical and/or interface protocol) for delivering the packages into the device may be used, and will vary depending on the device being updated (e.g., wireless for SmartPhones, USB for smart displays, via some physical connection with some desktop update application, and so forth. The end user interface experience will vary depending on the type of device being updated, and the update process as customized by the device manufacturer. In keeping with the failsafe aspects of the present invention, each temporary package is stored in persistent storage, so that in the event power is lost, the system is able to recover and proceed with the installation.

The update process is triggered when the package validator library is invoked. In one implementation, an executable file named UpdateBin.exe is associated with the .pkg.cab, .pku-.cab and .pks.cab file extension. This executable makes use of the Package Validator library to determine the set of Packages to use to update the device.

The package validator checks the signature(s) on the packages, validates package contents, verifies versions, and so forth. Once the update packages are deemed appropriate, they are queued for installation, and the validator sets an update flag to signal to the device that an update is available, and then reboots the system.

Figure 5A:
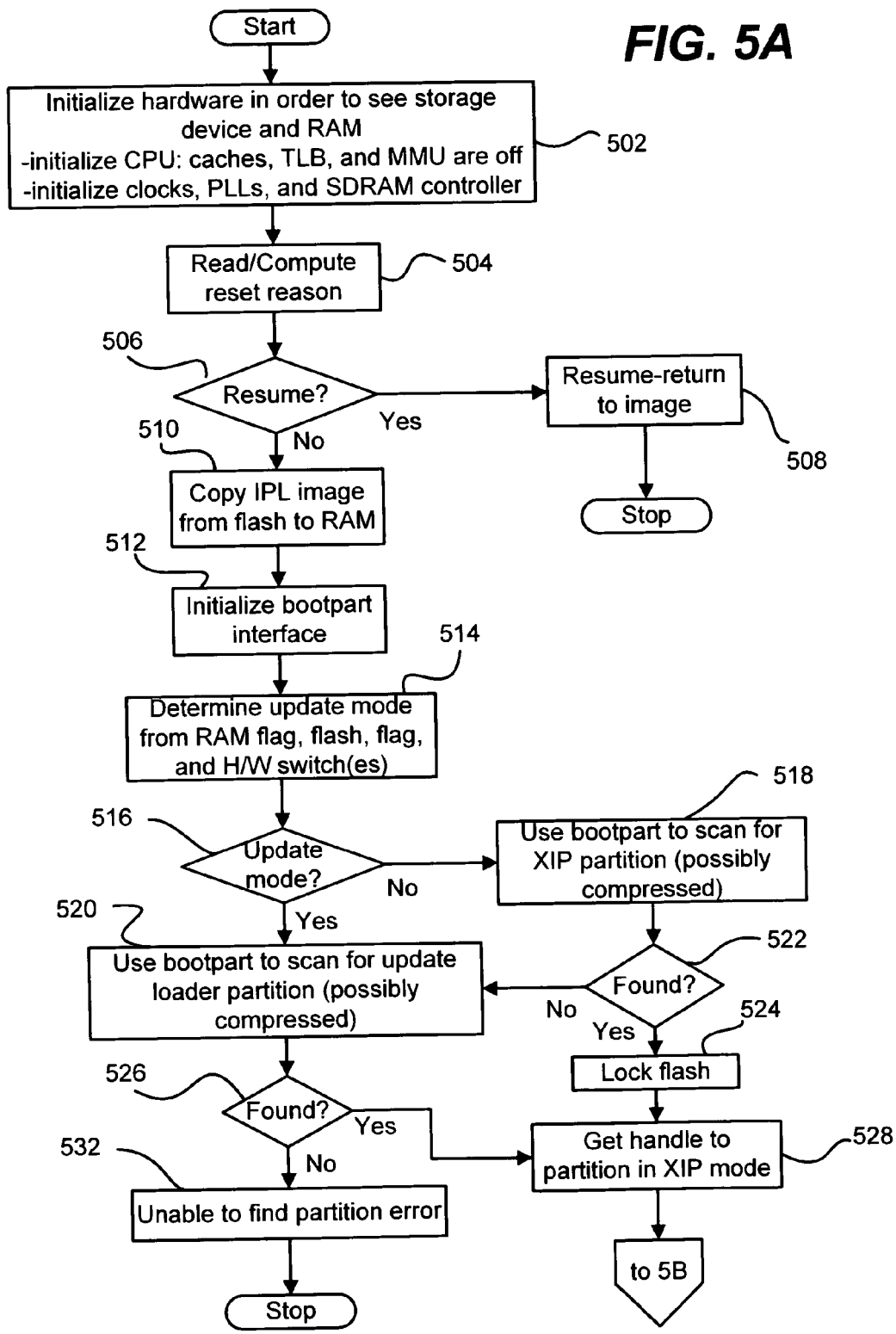
FIGS. 5A and 5B comprise a flow diagram representing example logic for an initial program loader boot process that determines an update mode in accordance with an aspect of the present invention.
Figure 5B:
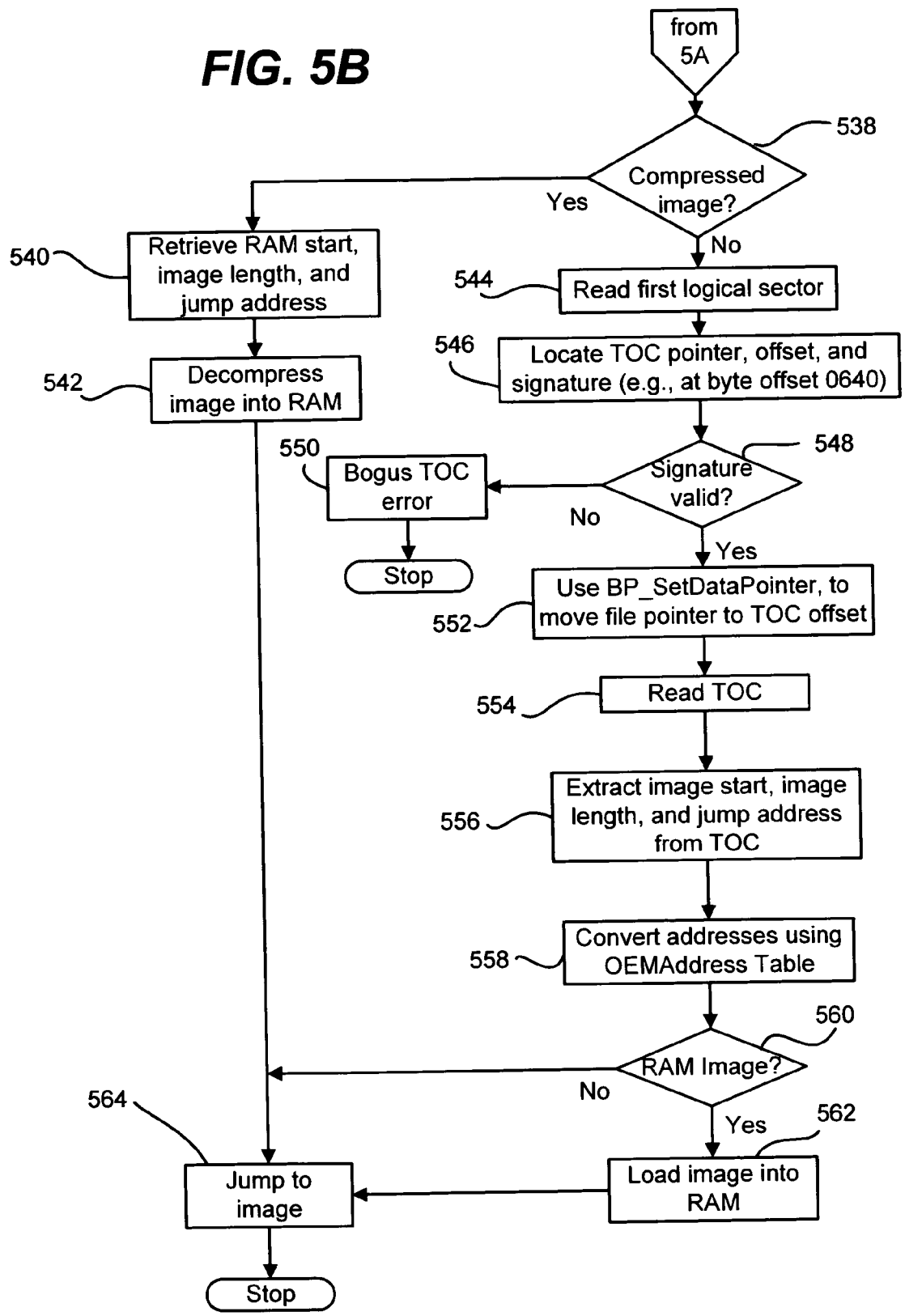

At reboot, the initial program loader 222 is the first piece of code that is run from the CPU's reset vector (although in some devices, the initial program loader may be bootstrapped by an existing bootloader image). The initial program loader 222 is responsible for determining if the device is in update mode or whether the device is in a normal boot mode. If the device is in normal boot mode, the initial program loader for locates and bootstraps the operating system image, otherwise the initial program loader locates, decompresses and bootstraps the decompressed update loader image 308. FIGS. 5A and 5B describes the initial program loader boot process. As shown in FIG. 5A, following some initialization at step 502 (e.g., to initialize the CPU, if NAND to initialize the controller, initialize SDRAM and so forth), the initial program loader determines via steps 504 and 506 the reason for the reset. More particularly, some CPU architectures mimic the reboot sequence when resuming from a suspended state. The start up code then typically differentiates a resume from a "normal" boot based on a CPU register value. The initial program loader accommodates the resume operation, and steps 504-508 are shown for completeness.

If not resuming, step 506 branches to steps 510-528, where as can be seen, the update mode is detected and the update loader partition is scanned for if an update (step 520), otherwise the operating system partition is scanned for at step 518. As seen via step 522, in the event that the initial program loader cannot locate an operating system image on the device, the initial program loader will attempt to load and run the update loader. If an appropriate partition is not found, an error is output (step 532); note that at this time, the device is not running with normal display drivers and the like, and thus any displayed images at this time are bitmaps from a data store.

Further, when booting to the operating system, the flash is locked via step 524, a step which is not executed booting to the update loader. The process then continues to step 538 of FIG. 5B to handle compressed versus non-compressed images. Note that FIG. 5B is for either the update loader or the operating system. The update loader is (on typical devices) stored in compressed form, while the operating system may or may not be, depending on whether the device is one that allows code to execute-in-place, (which if so cannot be compressed).

If compressed, the various information about the image is retrieved from the partition/image, and the image is decompressed into RAM and execution started via steps 540-546. Note that any suitable compression algorithm may be used, as long as the compression type and the format of the compressed data is known by the initial program loader. If not compressed, step 538 reads the information about the image from the partition sector at step 544, locates the table of contents (TOC), offset and signature from that sector. To this end, the initial program loader has prior knowledge of where the master boot record lives (the start of the next good flash block following the initial program loader image) and it locates the active partition in the partition table that is stored in the master boot record. Thus, the initial program loader depends on the romimage/disk image having the table of contents (TOC) properly located in both the operating system image's execute-in-place region as well as in the update loader image. In one implementation the following is provided as the location:

At byte offset (Image Start+0×40):
UINT32 ROMSignature;
UINT32 *pTOC;

This information is used by the operating system image to locate the TOC (as placed by Romimage/Disk Image). The pointer only makes sense when the memory management unit (MMU) is turned on and the mappings are compatible with the addresses for which the operating system image was built. An alternative is to implement the following:

At byte offset (Image Start+0×40):
UINT32 ROMSignature;
UINT32 *pTOC;
UINT32 TOCOffset;

where TOCOffset is a byte offset from image start location to the TOC and can be used by the initial program loader (or the update loader application) to locate the TOC without knowing where the image is built to run.

The initial program loader also may check the signature, as represented by step 548. If invalid at step 548, the boot process halts at step 550, otherwise the table of contents is read via steps 552 and 554 to find the image start, image length, and jump address from the table of contents. Step 558 fixes up the addresses as necessary based on a manufacturer-supplied data table. More particularly, the initial program loader often will be running in the device's physical address space (or sometimes in a virtual address space which may be different from that of the operating system image or update loader image). This routine is responsible for translating any image-specific virtual addresses (e.g., operating system image TOC values) into initial program loader-compatible addresses. If the manufacturer's startup routine does not enable the memory management unit, this means translating the virtual address into a physical one. If the memory management unit is enabled and the mappings are compatible with how the operating system or update loader image is built, then no translation is required.

Step 558 tests whether the image needs to be loaded into RAM (which if so would occur at step 562) or can be executed in place. The image (loaded or in place) is then jumped to start execution as represented by step 564. With the location of the active partition, the initial program loader (as designed) either loads the contents of the active partition (the Kernel Partition) into RAM in the case of NAND (or possibly NOR) or it jumps to the startup address within the partition if it is a NOR (execute-in-place) kernel. If a normal boot, the kernel starts and continues loading the operating system components also located in the kernel partition to the point that the operating system is able to read from the system partition. Anything not located in the kernel partition at this point is fetched (either loaded or executed in place) from the system partition until the operating system image is fully booted.

In one implementation, the initial program loader is a relatively very small-sized software component that is bootstrapped by the CPU's reset vector, and is responsible for conditionally loading/starting the operating system image or the update loader image. As described above, the initial program loader needs to be able to read various registers, including a RAM flag, a flash/non-volatile flag, and a hardware switch to determine, whether it should boot the normal operating system image or the update loader image. More particularly, the initial program loader will need to check for any flags set by the UpdateBIN application (e.g., following validation) or by the update loader application because typically, the operating system image runs with a read-only flash file system. In order to accommodate power failure conditions, the update mode flag should be non-volatile, and thus if unable to store a non-volatile flag before rebooting, then the update loader application sets the non-volatile flag when first run and clears the flag upon successful completion of the install, thereby making the flag persistent across power failures.

Further, the initial program loader needs to parse storage partition structures in various types of storage technologies to locate the images, and is able to handle compressed image types, as well as flash XIP (execute-in-place in flash) and RAM images (copied to RAM for execution). The initial program loader in general abstracts storage attributes such as partition structures, reserved blocks, bad blocks, and the like, as well as the specifics of any storage technology (e.g., NOR flash, NAND flash, HDD, DOC, and the like for any OEM-provided code. The initial program loader may validate the integrity of the operating system image and/or the update loader image (e.g., by performing checksums or signature verifications) prior to bootstrapping the image, such as to detect malicious updates and thereby provide a means to verify trusted code for digital rights management, which needs to trust that a UUID returned from the kernel image is being provided by code which has not been maliciously tampered with.

Thus, as can be seen from FIG. 5 and as shown in FIG. 3, when in the update mode the initial program loader 222 decompresses the compressed update loader 220 into RAM 304 as the uncompressed update loader 308, leaves the flash unlocked to give the uncompressed update loader 308 write access to the system flash, and jumps to the uncompressed update loader code to begin execution. The update loader application, when bootstrapped for the first time by the initial program loader, will need to store a flag in non-volatile storage indicating that the device is in update mode. This is because the operating system image will likely have a read-only flash file system and will be unable to set this flag, which is important for power-loss recovery. The initial program loader will check for the existence of a RAM flag as well as this non-volatile flag when determining whether to load the update loader image or the operating system image; the RAM flag is set (directly or indirectly) by the UpdateBIN application.

Turning to an explanation of the update process, as described above the process for updating kernel or system partition content executes after the update loader is fully booted and loaded into RAM, and operates to find the validated packages (as specified by the validator) in the user store. Note that the update loader contains the necessary filesystem driver(s) and begins the update process one package at a time. Package information for updated packages is recorded in the filesystem for use by the validator on future updates. In accordance with an aspect of the present invention, to provide for failsafe updates, the initial program loader is able to recover from a random power failure at any point during the loading process. To this end, update progress is tracked in a transaction log to allow for roll-forward updates should a power failure occur during the update.

In update mode, the update loader runs and starts an update application, which is an executable that is a part of the update loader image 308 (FIG. 3), and is responsible for applying the contents of the packages to the NK/kernel partition 204 and the system partition 206. In other words, the update application that is loaded during an update process by the initial program loader is responsible for applying the package updates to an image. Note that the update loader image contains a minimum set of modules necessary for the update application, such as nk, filesys, flash driver, coredll, IMGFS, and so forth.

Figure 6:
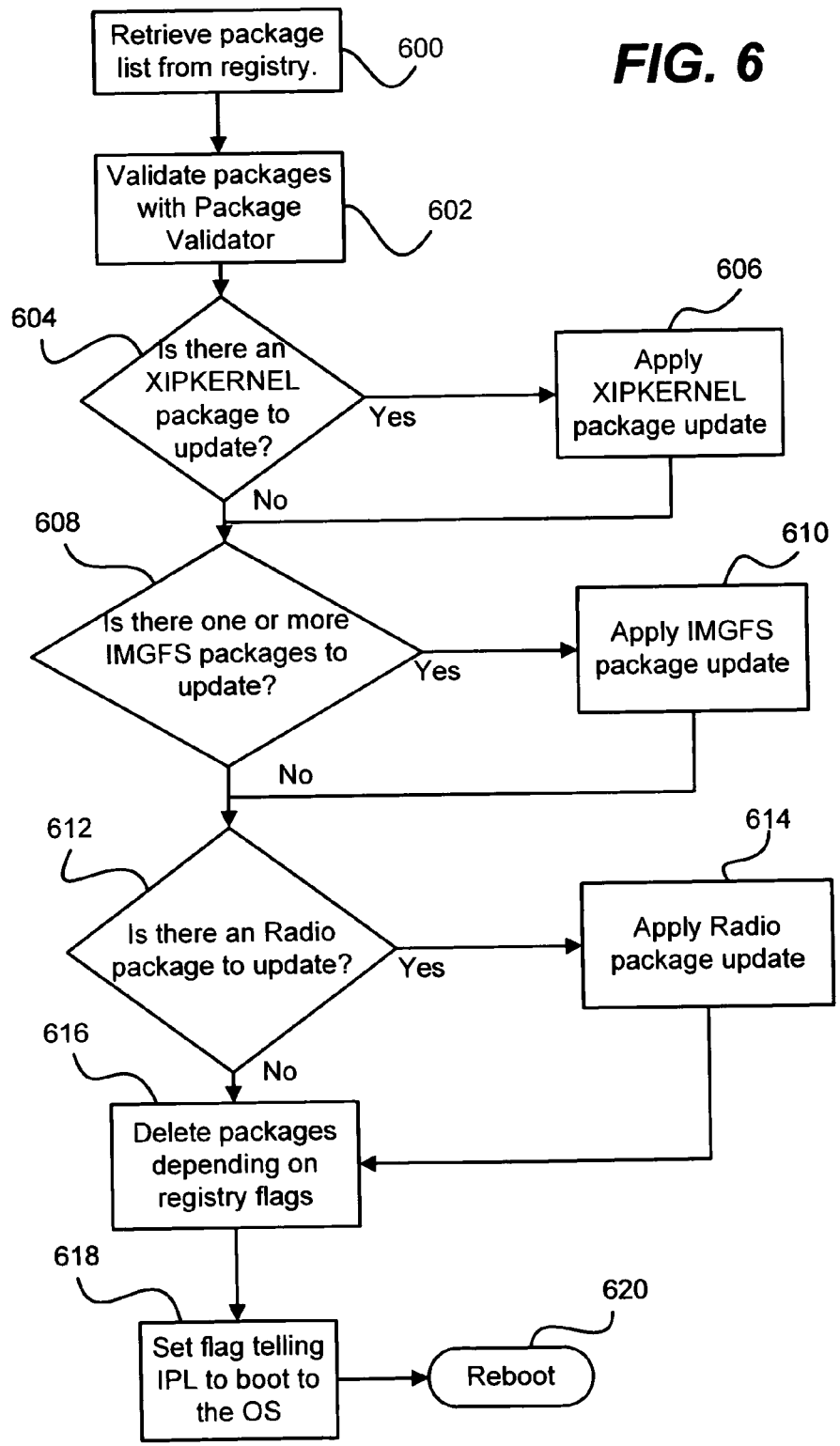
FIG. 6 is a flow diagram representing example logic for an overall update process, in accordance with an aspect of the present invention.

FIGS. 6-8 describe the overall update process, the application of NK/kernel partition updates, and system partition updates, respectively. The update application works with the Package Validator to validate the packages, and a ROMIMAGE module to handle virtual and physical allocation, fixups, and arranging functions. As can be seen in FIG. 6, the update application retrieves the package installation list (e.g., from the registry) at step 600, validates the packages via the validator (step 602). In update mode, the update application is responsible for applying the contents of the packages to the NK/kernel partition and the system partition.

Before the update application applies the package contents to non-volatile storage, the packages are validated, which includes (among other things) signature checking to verify that the update is from a trusted source. As can be readily appreciated, knowing that a package update comes from a trusted source and ensuring that there is a single trusted gatekeeper that has writeable access to flash is important when trying to protect the integrity of the device's flash. Update packages are signed during the build process, and provided they are signed by one of possibly many different per-package trusted sources for an update, are allowed to continue through the package validation process described above. If they are not signed or are not signed by a trusted source, the package fails validation and thus not be updated.

Note that the design of the system is such that the only software component allowed to update the contents of flash is also the same component responsible for checking the validity (including checking the signature) of any package queued for installation (the update loader). Also note that the Update Loader can not include any untrusted or 3rd party code, like a general purpose operating system. Thus, this system is running only trusted code and is less susceptible to tampering. When not running the update loader, the design makes use of a hardware lock mechanism that prohibits writing to the flash part (at the hardware level) without first resetting the part (which is typically tied to the CPU, thus resetting both). Further, the operating system image contains a read-only version of the file system, thus further ensuring that the contents of flash are not updateable unless the system is within the update loader context, where package validations and security checks are guaranteed to be performed.

Verification also includes checking the package contents for correctness, correlating information in the device manifest file with the contents of the package, and ensuring that a file (by name) exists in one and only one package. Validation also verifies that the necessary versions of packages are either already installed on the system or are queued for install. For example, if version 1.0 of package A is already installed on the system and a delta/difference package A taking version 2.0 to version 3.0, there needs to be a package queued for install that will get package A to version 2.0 in order that the delta/difference package can be installed. Still other verification includes verifying that necessary package dependencies are satisfied. For example, if version 2.0 of package A depends on the contents of version 3.0 of package B, verification checks that the latter package already installed or is it queued and validated for install. The package validation process is also described in the aforementioned U.S. patent application entitled "Determining the Maximal Set of Dependent Software Updates Valid for Installation."

The result of the validation process on the device is a list of packages (and their files) which can be installed on the device because they have met the validation requirements. The validation process also generates a list of packages which cannot be installed along with data as to why the validation process failed for each specific package. The remainder of the installation process makes use of only the packages that passed validation.

Returning to FIG. 6, the update loader is responsible for applying any update to the Kernel partition (steps 604 and 606) and any system updates to the system partition (steps 608 and 610). If there are other updates, such as to a reserved radio section of memory (that exists outside the scope of a partition, that is, uniquely placed at a specified location in flash with the partition structures defined "around" the reserved areas), these are handled similarly via steps 612 and 614, as also described with reference to FIG. 10.

The packages may be deleted via step 616. The flag is set to a value (e.g., cleared_ at step 618 to boot the operating system image, which if kernel updates or system updates were made, is now-updated, and the system rebooted (step 620).

Figure 7A:
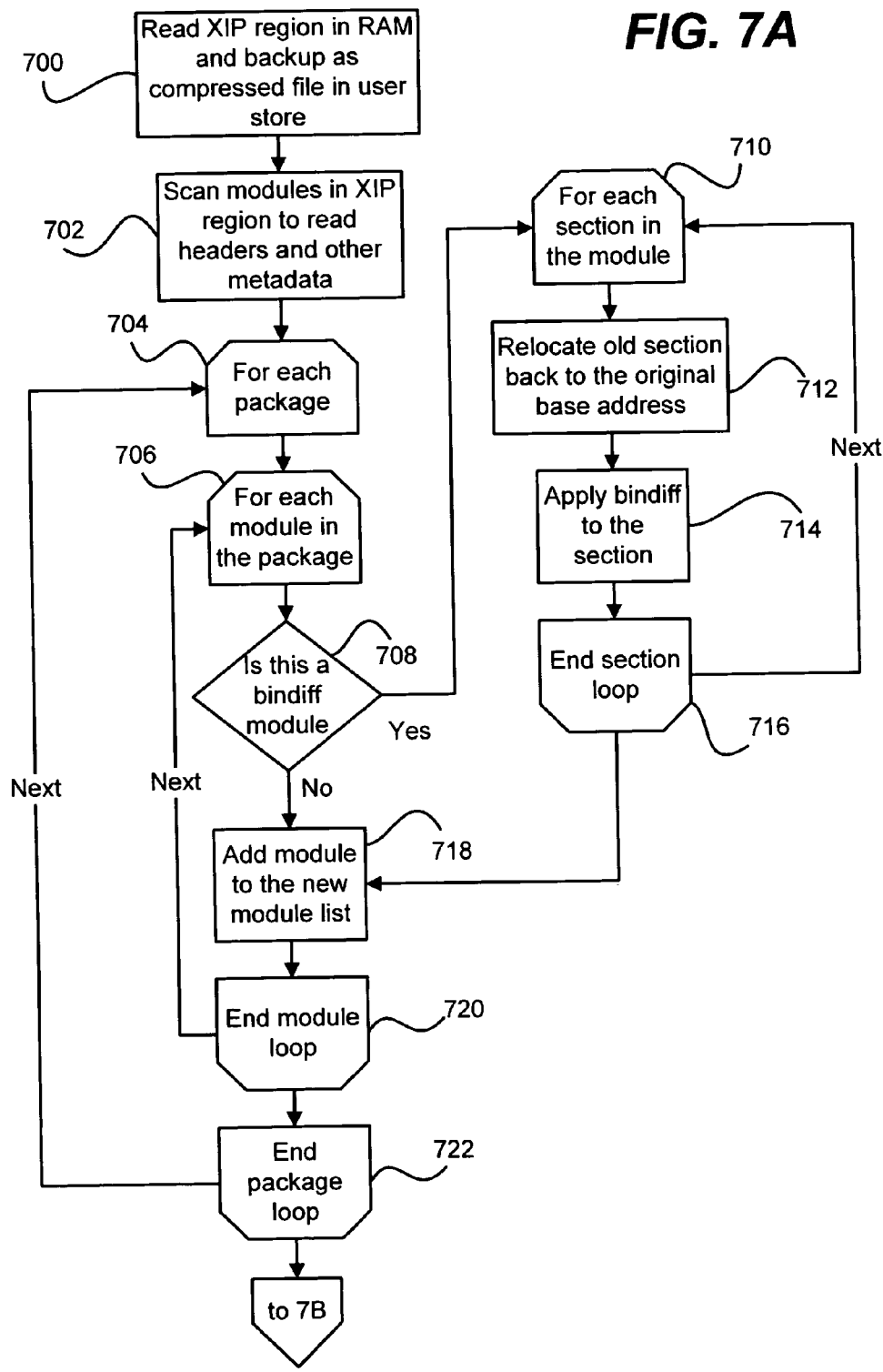
FIGS. 7A and 7B comprise a flow diagram representing example logic for updating a kernel partition, in accordance with an aspect of the present invention.
Figure 7B:
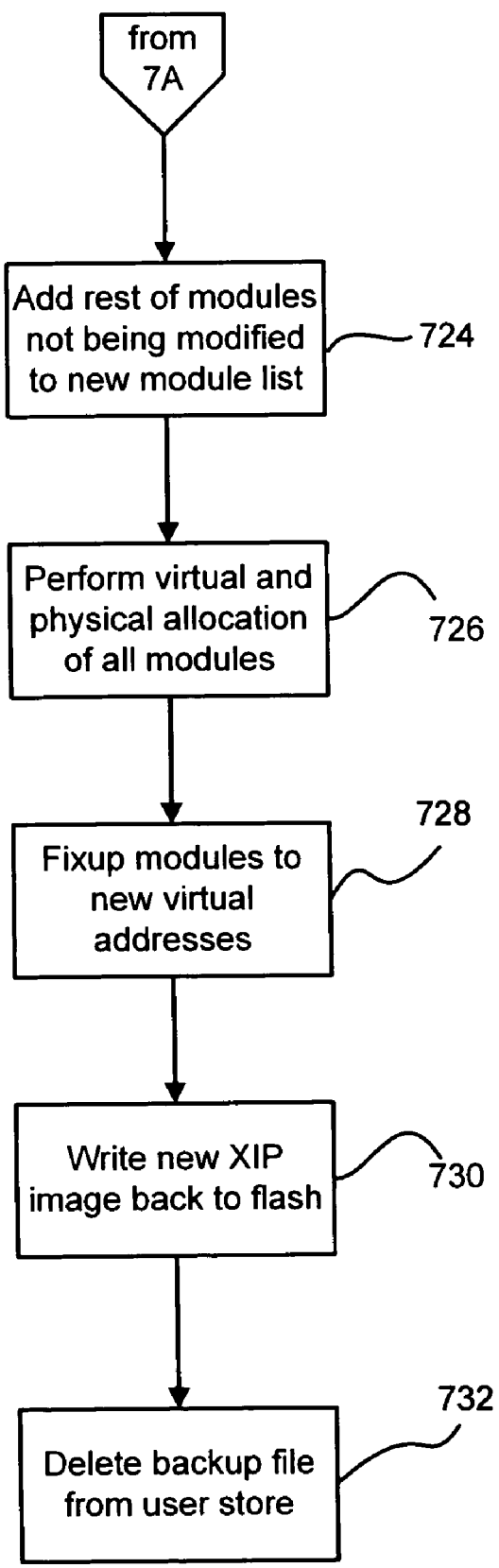

FIGS. 7A and 7B show general logic for the kernel update, where (assuming execute in place) the existing kernel is backed by reading it into RAM and compressing it into the user store. This is represented by step 700, where the XIP partition, exposed through the file system as a XIP folder with one default file, has its handle obtained for reading the entire image into local buffer. A new file is created in user store, a compression routine is called to compress the image, and the compressed file data is then written to the new file.

Step 702 reads headers and other metadata. To this end, the process walks the pToc (table of contents structure) to determine the location of each section, filling in an old modules list with the module information, and a section data pointer set to point to the appropriate place in the in-ram copy created for the backup. Parts of the existing TOC are maintained and copied into the new TOC near the end of the NK/XIP partition update. Note that while reading the headers for a module, the process also reads the old device manifest file for additional flags (compression, kernel module, slot 1 override [L flag], and the like.

Via steps 704 and 722, each package is then processed, by processing each module in the package (steps 706 and 720), determining whether the file is a bindiff (binary difference) module. This involves looping through each module in each package, and either applying a canonical update, where the entire copy of the new file is provided, or applying a bindiff update, where only the binary difference of the file is provided. The process of applying a bindiff is called patchbin; a separate bindiff is done on each section, one at a time. The headers for the new module are provided in raw canonical form. As files are updated one by one, they are added (in the form of file objects) to a new file list. At the end of this step, there is a new file list containing unfixed up versions of the updated modules and files. If they were existing files, then they are removed from the old list, so that the old list at the end of this step only contains files for which there were no updates. Note that the process knows which package(s) are associated with the partition based on the presence of the package manifest file(s) in that partition. Any new packages which have not yet been installed on the device are saved in the IMGFS partition.

Thus, if not a bindiff module at step 708, the module is simply added to the new list at step 718. If a bindiff module, then the differences need to be applied to the old code, which steps 710-716 perform section by section.

More particularly, as described above, the delta/difference package contains one of more binary difference files, with each binary difference file corresponding to a specific file/module. The difference file is based on a specific baseline revision to which it gets applied at install time, and the difference file is typically smaller than the entire canonical file of the resultant version, whereby it improves download times/costs and reduces the amount of temporary storage overhead needed during the installation process. Binary difference files are generated at build time based on detecting the differences in files/modules between two different canonical packages. If the files are executable modules, they have been processed by the linker and located at a linker-defined address. They have not been relocated to the final location, which is done on the device at install time, as described above.

In order for a binary difference of an executable module to be applied to the baseline version already on the device, that baseline version needs to be un-relocated back to the linker generated base address from which the binary difference was calculated. Once the binary difference is applied to the un-relocated version of the module, it can be relocated to the appropriate base virtual address. The process of un-relocated and relocating is the same, and is accomplished by shifting the base address of the module to a specific location.

When each package has been processed, the kernel update continues to step 724 of FIG. 7B, where any modules that are not being modified are added to the new module list. At this point, the old file list contains the modules and files that will not be updated; these need to be un-fixed up these back to the original base address so that there is one uniform list of unfixed up modules and files that can be processed in its entirety. The objects from the old file list that appear in the new device manifest file are transferred into the new file list. Note that if a file is to be deleted, it will not appear in the new device manifest file, and therefore not be put into the new module list.

Memory allocation and fixups are performed at step 726 and 728, and the new execute-in-place kernel image is written back to flash at step 730, which is also done by a disk image tool and implemented in romimage.dll (as described below). There is a function in romimage that takes a module list and construct the image by allocating a new buffer to construct a new image, looping through the module list to copy the section data at the appropriate location as specified by the data pointer and copy headers and file name strings to proper locations, as specified in the table of contents (TOC). As described below, a new TOC is written at the end of the image and a pTOC pointer updated to point to location where the new TOC is placed. As also described below, bands of data sections in slot 0 are tracked for the NK/XIP image, which are concatenated with the IMGFS bands and outputted into the IMGFS file which contains a ROMINFO structure during the IMGFS update.

Before writing anything out to flash, the process records in the log file that the write is in progress. Once the write is complete, that is recorded, whereby if power is lost before the backup file is deleted, the correct state is known.

If successful throughout, the backup file is deleted at step 732, which includes writing to the log file that the XIP partition is complete after deleting the file. If an error occurs during any step of the NK/XIP update process, such as if the image grew past the partition size, then the backup version of the image is restored, with suitable user interface indicating that an error occurred during the update and the original image was restored. If the backup version could not be written successfully (such as in a flash error), then a different UI message is provided to indicate that an error occurred during the update but that the original image could not be restored and may be corrupt.

Also, the status of the update is recorded for UpdateBin. Note this is different that the log file that the Update Application uses internally for transaction logging.

At this point, there is a single file list of the modules and files that will make up the image. This is the same as with initial installation as performed by a disk image tool in conjunction with a romimage.dll, as described in aforementioned related U.S. Patent Application entitled, "Creating File Systems Within a File In a Storage Technology-Abstracted Manner."

At a high level, the package installation process involves extracting the contents of a package and applying it to the device. The mechanics, however, include a number of steps that mainly revolve around the concept of code fix-ups or code relocations. The present invention performs fix-ups/relocations on the device at install time rather than on the build system at build time. A benefit is the adaptability of a package install to a specific system, in that the installation does not require that the entire device image be available at build time. Rather, it allows package updates to be treated as largely isolated entities from the specific operating system image configuration installed on a device.

In order for an executable module to be relocatable, the module needs to contain information that will direct a locator to the addresses within the module that need to be updated as the base address location for the module is changed. The image update model makes use of a relocation information encoding scheme to provide this information, in a compressed form, within the executable module itself.

A RelMerge tool, as generally described in the aforementioned U.S. patent application "Self-Describing Software Image Update Components, converts a module (.EXE or .DLL) into a format which is suitable for inclusion in a package, and therefore installation into the device. This includes converting relocation information to a compressed format which is more suitable for long term storage on the device, and converting the file headers to the _rom variants used by the ROMFS filesystem on the device. In addition, any excess padding is also removed from all sections of the file when it is re-layed out.

Once encoded with this information, the base virtual address of an executable module can be changed and all relevant address references within the module can be modified to account for the change in base address. The relocation process makes use of a code library which is shared between the device and the desktop. In the latter case, it is used to create the initial manufacturing image such that actual relocations are performed on the code modules, and also to create a list of the virtual address space used as each update module is installed, thus allowing the consumer of the API to trust that module relocations will not overlap. Creation of the initial manufacturing image via a disk image tool and a romiage.dll component is described in the aforementioned related U.S. patent application entitled, "Creating File Systems Within a File In a Storage Technology-Abstracted Manner."

In general, the virtual/physical allocation and fixing up works the same as in the disk image tool, that is, to locate the old table of contents (TOC) from the NK/XIP image, and locate the old ROMINFO. A pointer to the TOC is located at a fixed location (e.g., offset 0×44) in the image. The old ROMINFO structure is read from the IMGFS file called ".rom".

To allocate virtual addresses, a slot 0 Allocator starts with the top of Slot 0, and ends based on the value dwSlot_0_DllBase in the IMGFS ROMINFO structure. A slot 1 Allocator start with the top of Slot 1, and ends based on the value dwSlot_1_DllBase in the IMGFS ROMINFO structure. The code and data is then fixed up to the new VA allocation, and the entire module list made available. Sections marked as compressed are compressed, and the size recorded in a module object.

To allocate physical space for image RAMIMAGE is used for RAM and ROMIMAGE for flash. For RAM, a RAMIMAGE physical allocator uses physfirst from the old TOC as the start address of the physical allocator. The end of the physical allocator is initially specified as ulRAMEnd from the old TOC. For RAMIMAGE, RamStart=PhysFirst+PhysLength (the actual length required for the image) is returned by the physical allocator; virtual address locations for copy section are determined starting from RamStart, and from there, text/data that refers to the copy section is fixed up.

For ROM, a ROMIMAGE physical allocator uses physfirst from the old TOC for the start address of the physical allocator, while the end of the physical allocator is determined by getting the length of the partition on flash, using GetPartitionInfo.

Note that an updated TOC is generated during the physical allocation process.

Unlike the XIP partition, in the IMGFS partition the entire image will not be remade, as this would be too large to backup. Instead, the IMGFS file system is used to apply updates to individual modules and files, one at a time. Moreover, note that the individual modules and files may be too large to do as a whole, and thus the updates may be applied via smaller blocks, as described below with reference to FIG. 9.

The IMGFS update uses the same file list that the NT update did, although one list will get updated as the process proceeds. As described below, the IMGFS may first simulate the update process, requiring two passes through the process. In a first pass, both IMGFS and the update application do not commit anything to flash. If the simulation succeeds, then a second pass is run to actually commit the changes. If the simulation fails, the simulation is retried after re-running the PackageValidator, and pass in a list of packages excluding the package that failed. The simulation will then run again with the new list that package validator returns. The simulations are retried until either a simulation succeeds or there are not any packages that can be applied. This guards against data corruption that may have occurred in the package that was signed despite the corruption.

Figure 8A:
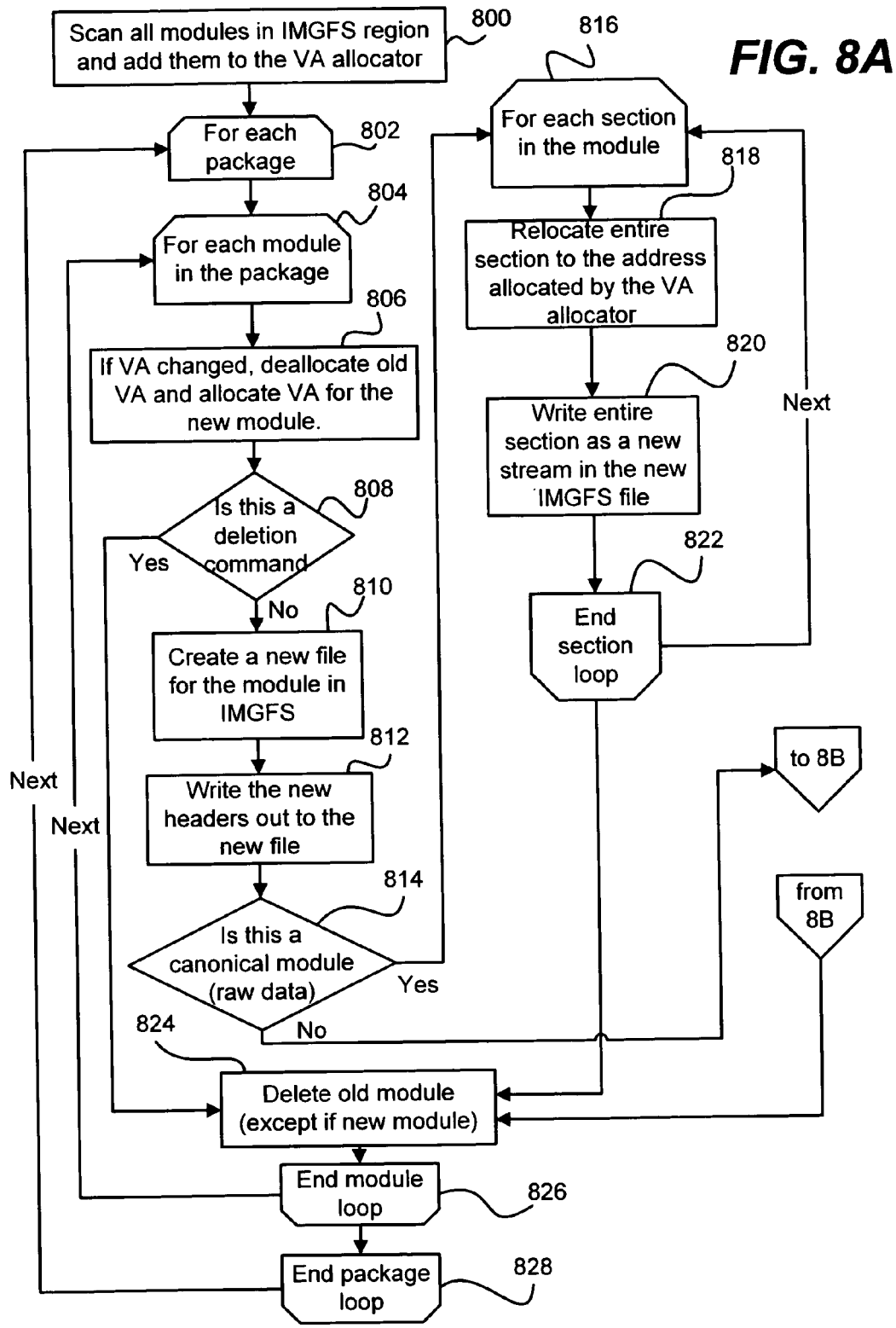
FIGS. 8A and 8B comprise a flow diagram representing example logic for updating an operating system partition, in accordance with an aspect of the present invention.
Figure 8B:
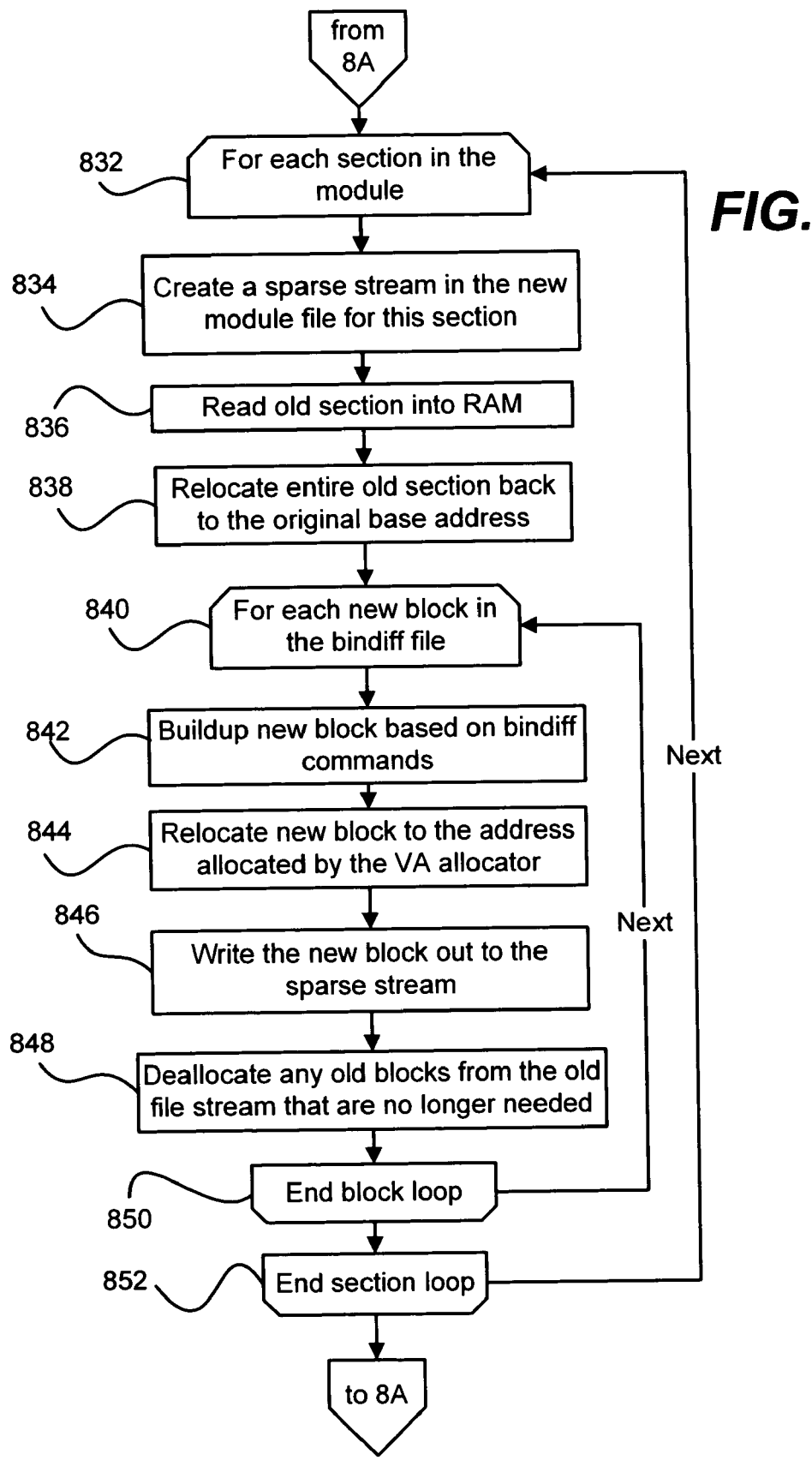

FIGS. 8A and 8B show general logic for the system partition update, wherein the update application interfaces with a read/write version of the image file system driver (IMGFS) to manage the system partition. Note that in normal (non-update) operation in typical systems, the system partition is read-only to the IMGFS driver (and the flash is locked). Further, note that unlike kernel updates, system updates are not backed up as a whole, although transaction logging can restore the device to where it was in the system update process prior to a failure (e.g., power failure) and the system updates can resume from that point.

At step 800, the existing modules in the system partition (the imgfs region) are scanned and added to a virtual address (VA) allocator. During the process of scanning, the process also detects deletion cases. More particularly, when iterating through the modules in IMGFS using the existing device manifest file, the process checks to see if the file appears in the new device manifest file for the package. If not, the file is deleted from the IMGFS partition and the process continues with the next file. If so, new module flags are obtained from the new device manifest file, and module headers loaded into the module structure using IOCTL_BIN_GET_E332 and IOCTL_BIN_GET_O32. Note that the data for the data modules and files is not read in at this time, as this is not needed.

Once each module header has been read in, the module list is passed to the allocators to reserve virtual addresses (including reserved sections which are known from the reserved table stored in flash).

Once the existing modules have been scanned and the currently allocated virtual addresses defined, the process is ready to begin the update. To this end, the process loops through each of the packages (via steps 802 and 828), and loop (via steps 804 and 826) through each file in the package, processing each file one by one. Files are processed in order of net gain in size, starting with files that shrink the most and ending with files that grow the most. The delta in the file size is determined by comparing the old device manifest file with the new one.

If power is lost during this process, then a log file will tell exactly which package and which file in the package the process left off with. The process will resume at the file that was left off with, with the updated files that were complete up to the point of power failure treated as existing files. To recover, any new modules that were in the process of being updated will not be included in the initial reservation, while the old module is in the reservation. The old module virtual address space is deallocated, as usual. If the new header has already been written out, then it will contain the virtual address space allocation for the new module. In this case, it is added to the virtual address space allocator using a Reserve function. If the new header has not been written out yet, new virtual address space is allocated as normal using the Allocate function.

Part of the above processing includes (for executable, not data files) updating the virtual address allocation for update modules by determining whether the virtual address changed, and if so, deallocating the old virtual address space and allocating virtual address space for the new module as represented by step 806. If the virtual address size changes, a Deallocate function is called to remove the old virtual address space from the allocator and an Allocate function is called to allocate new virtual address space for the new module, with appropriate alignment requirements passed in depending on code or data. The deallocation may correspond to a command to delete the module, in which case the old module is deleted via steps 808 and 824, (but not if it is a new module that was just installed). If not a deletion command, step 810 calls a CreateFile function in IMGFS, e.g., using new_<module_name>.<module_extension> in naming the new file, to create a new file in the image file system; (to recover if power fails around this operation, the file is not again created if it exists).

For executable files, step 812 writes appropriate headers thereto by reading the new header into the module object and updating the header with the new virtual address space allocation, as represented via step 812, using IOCTL_BIN_SET_E32 and IOCTL_BIN_SET_O32. Each operation is atomic in IMGFS. At this point, the header should be complete. The data pointer (dataptr) is left alone (zeroed), as IMGFS fakes this value when the kernel requests the E32/O32. The headers are in the canonical form, even in the bindiff file.

If power is lost with respect to writing the headers, if both headers exist, then no recovery needs to be done. If only the E32 has been written out, then only the O32 header is written out again. The existence of each header is known via IOCTL_BIN_GET_E32 and IOCTL_BIN_GET_O32.

To apply updates, it is noted that the update to the file can either be in canonical form or bindiff form. If the updated file is not a module, then the data for that file is processed in the same way as an individual section. If the file is a module, then each section is processed one at a time, in order of net gain, starting with the section that shrinks the most. The .creloc section is processed first. Each section is written to a new stream. If the file is a regular data file, the data is written to the default stream.

If the module is a canonical update as evaluated at step 814, steps 816-822 process each of the sections in the module, including relocating an entire section to the address allocated by the virtual allocator (step 818) and writing the entire section as a new stream in the new IMGFS file (step 820). The old module is then deleted at step 824, unless again the "old" module is actually a new module.

In the canonical case, recovery for a power failure is performed by obtaining the size of the each stream in the new file that has been written out and compare it to size of that section in the canonical file. If a stream in the new file is smaller than the canonical file, then that is where the process left off and can resume copying over the data.

In the bindiff case, the patchbin process is done one block at a time (as described below with reference to FIG. 9), where a block equals the page/sector size. This is because there may not be enough flash space to keep both an old version and new version of a section around. Blocks for the new file may be created in any order as specified by the bindiff file, such that the patchbin process can be done with the optimal use of flash space. As new blocks are created, old blocks can be deallocated as they are no longer needed.

To this end, if the module is not a canonical update at step 814, the process branches to FIG. 8B, step 832, where in conjunction with step 852, each section in the module is looped through to apply binary updates on a block-by-block basis. More particularly, step 834 creates a sparse stream in the new module file for this section, and the old section is read into RAM (step 836). The entire old section back is relocated to the original base address (step 838).

For each new block in the bindiff file (steps 840 and 850), a new block is built based on bindiff commands (step 842). The new block is relocated to the address allocated by the virtual address allocator at step 844, and written out to the sparse stream at step 846. Any old blocks from the old file stream that are no longer needed are deallocated, as represented by step 848. The concept of block updates is also described below with reference to FIG. 9.

In the bindiff case, power failure is handled by narrowing down which section was left off with by comparing the stream size with that specified in the header. Once the section is determined, an instance of the patchbin is created, as usual. As it returns the next block in the order (the patchbin output needs to be reproducible/deterministic), a check is made as to whether that block has been committed. Since block writes are atomic, partial blocks cannot be committed. If the block has already been committed, the data returned from patchbin is discarded, and a verification is performed to check that the appropriate old blocks have already been decommitted. Once the block left off with is found, (that is, one that has not been committed yet), the process continues as normal.

To finalize, if this was an existing file or module and the bindiff case, then the old module is deleted (in the canonical case, the file was already deleted), and the log file records that the module has been finished. If a package has been finished, this is recorded instead. When done with all packages, the .rom file is updated with an updated ROMINFO structure, which contains the Slot0 base, Slot1 base, and the bands of Slot0 data for both the NK/XIP and IMGFS images.

If an error occurs during any step of the IMGFS update process, such as if bindiff did not have enough flash blocks available, then the update process is canceled and a recovery is not attempted, since it is likely to be unrecoverable and an appropriate message is displayed. Note that running a simulation beforehand prevents such an issue.

As can be seen, updates to the kernel partition are treated differently from updates to the system partition, although from the build and packaging standpoint, they are the same. More particularly, when updating the kernel partition, some amount of an NK.NB0 (the signed kernel partition image) file is fetched from flash into RAM, constituent components are updated and fixed up as appropriate, and then the modified .NB0 contents are written back to flash in contiguous blocks. This allows for skipping any bad blocks as necessary.

In accordance with another aspect of the present invention, as described above the mechanisms consider the concept of optimized ordering for how a binary difference files are applied. As is understood, some amount of scratch pad memory is required to apply a binary difference file to the baseline image and thus generate the resultant updated module/file. At build time, when the binary difference file is generated, an arrangement process is run on the resultant image to order the way in which blocks within the binary difference file get applied, such that the necessary available scratch pad memory is held to some specified maximum. By performing this optimizing operation on the build system, the present invention ensures that if the device has sufficient memory for the overall growth (or shrinkage) of an image and it has the necessary scratch pad space, then the device is certain to have sufficient memory to complete the update process. The sizing check is performed during the validation process, before beginning the update.

Figure 9:
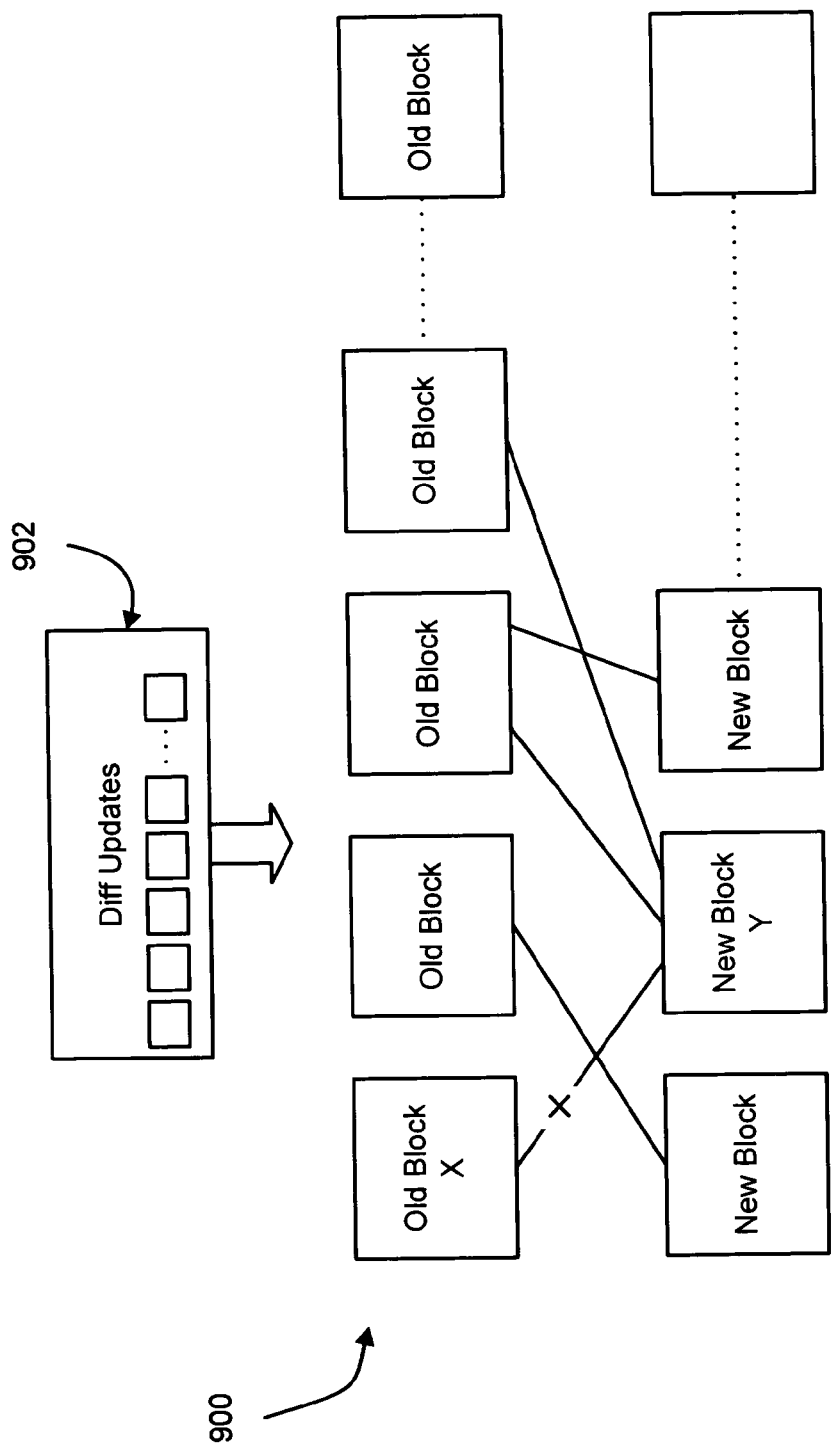
FIG. 9 is a block diagram representing applying an update to a device in blocks via a dependency graph, in accordance with an aspect of the present invention.

FIG. 9 generally represents the concept of block updates. In general, system files can be large and thus might otherwise consume a large amount of temporary storage (more than might be available) if a new file was created as a whole and the binary difference applied to the old file as a whole. Instead, difference updates are applied to existing blocks of a file being updated, resulting in new, updated blocks, with the updated blocks copied to the updated file stream and the old blocks deallocated when no longer needed.

To accomplish block updates, a graph of dependencies between the old blocks and the new blocks is constructed, as generally represented by the graph 900 in FIG. 9. As is understood, the difference files 902 will be applied to the actual blocks of data represented by the nodes in this graph. In one implementation, blocks are four kilobytes in size and a maximum of thirty-two allowed at any one time, meaning that only 128 kilobytes need to be available to guarantee that a system can be updated. Note that the above, example block sizes and the overall limit are arbitrary values, but need to be agreed upon by the provider of a system update and the update application on the device. In the event a particular update is unable to meet the agreed upon limits, during the building of the update at the vendor's location, dependency links will need to be broken (non-difference updates are required for such blocks) by the vendor.

As represented in FIG. 9, a single old update block can provide the dependent data (to which the difference file is applied) for one or more new update blocks, and a new update block can be dependent on one or more old update blocks. In general, updates progress by applying the appropriate difference file or files to an old block, until every difference file for that old block has been applied. At this time, the dependency link may be broken (e.g., as represented by FIG. 9 by the break in the link between old block X and new block Y) because the old block is no longer needed by the new block. Because this was the only link associated with the old block X, the old block X can be deallocated to free up space for another block. Likewise, as dependency links are broken following application of the difference file to an old block, when a new block has no dependency link to an old block, that is, when a new block has been fully written via the difference update process, that new block can be copied to the flash as appropriate and deallocated from RAM to free up space for another block. Note that multiple blocks may be deallocated at the same time.

As can be readily appreciated, the order of applying difference updates can help in the freeing of memory. In general, the order is to first apply difference updates to an old block that has the fewest dependency links to a new block that has the most dependency links. An algorithm performs a two-level search (e.g., of a link counter array) for lowest-count old blocks having highest-count new blocks.

With respect to performing a pre-flash simulation with block updates, because the entire file may not exist at any one time in the simulation, checksums are computed based on each block to be written, and the resultant checksum verified against a checksum for each update. If this simulation-generated checksum passes, then an actual update to flash can be performed.

Figure 10:
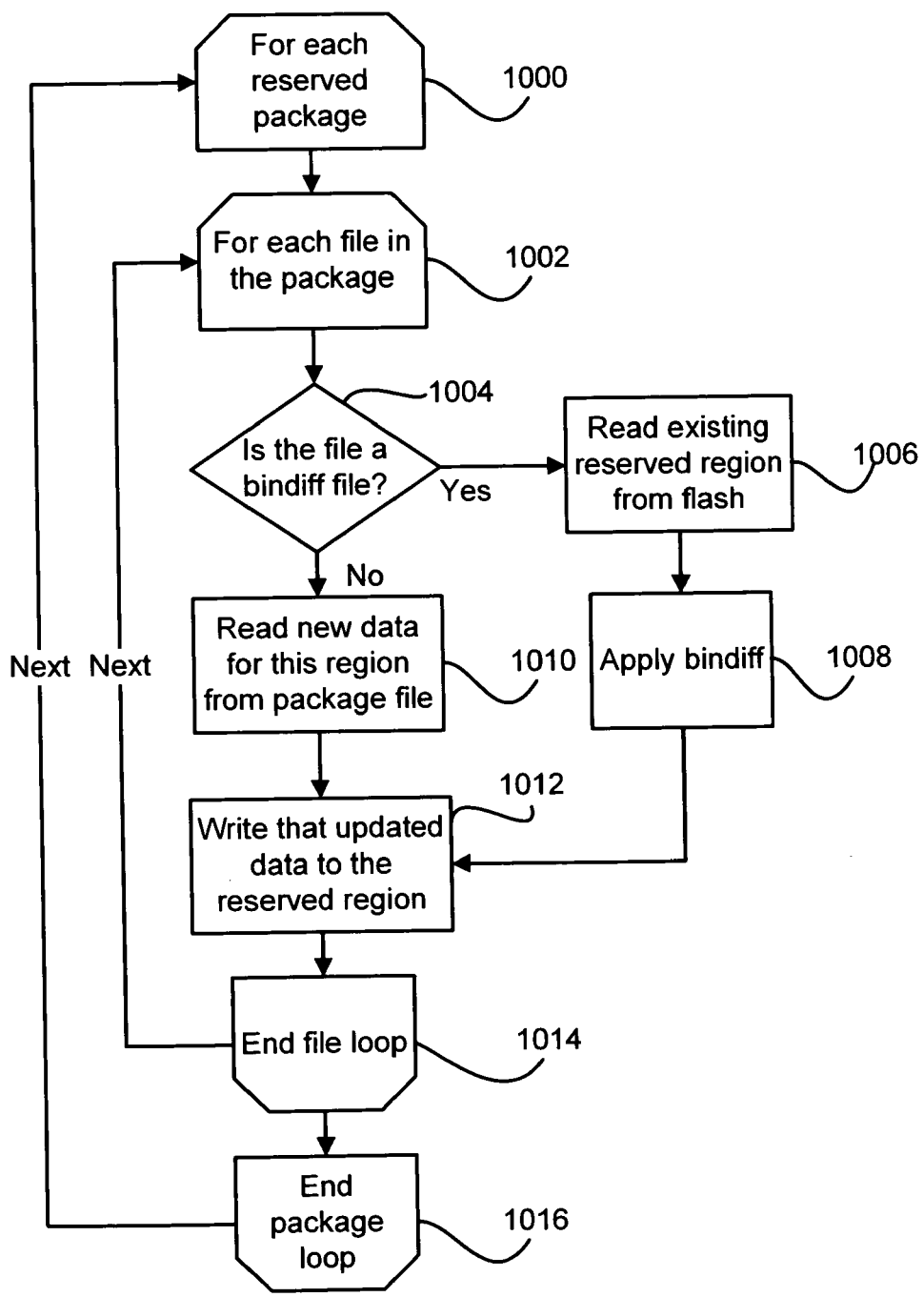
FIG. 10 is a flow diagram representing example logic for updating a reserved memory section, in accordance with an aspect of the present invention.

Turning to updating reserve sections, FIG. 10 shows that a reserve section update (e.g., outside of a partition) is accomplished in a similar manner to that of NK partition updates, using the same update components. Via steps 1000 and 1016, each reserve-related package update is processed, by processing each file in the package (steps 1002 and 1014), determining whether the file is a bindiff (binary difference) module. If not, the file data is simply read and written from the file to the reserved region at steps 1010 and 1012. If a bindiff module, then the existing region is read (e.g., into RAM) and the binary difference applied thereto before writing the updated data back to the reserved region, as generally represented by steps 1006, 1008 and 1012.

When the package contents for each queued package have been applied in the appropriate order (by package version) and the updates are complete, the package files can optionally be removed from the user store or otherwise marked as completed. At this time, once the contents of the validated packages have been installed into the appropriate flash partitions, the update application completes its work by disabling the update mode (the flash update flag is cleared) and the device is rebooted. As before, the initial program loader detects the current system mode, but this time, because of the cleared flag, the updated operating system image is booted with the flash locked, as described above, and the installation is complete.

In accordance with an aspect of the present invention, there are provided failsafe/recovery update methods. To this end, one part of the image update design provides failsafe recovery in cases where the update process is interrupted, e.g., due to an unexpected power loss. The means by which failsafe recovery is implemented includes having the update loader and update application be re-entrant and able to decide where the update operation left off, via logging and file system artifacts (i.e., roll-forward recovery). Also leveraged is a transactional file system that supports writing an update to a file without completely decommitting the old copy until the new update has been committed to storage (this is done in sub-file increments, e.g., blocks, in the system partition). Simulations of the entire install process up to the point that it is committed to storage may be performed to ensure that nearly all relevant code paths are exercised, while reducing the failure mode on an actual update to failures in the hardware (example: flash failure) or a possible failure in the low-level flash software routines. Backups of NK/kernel and reserved (e.g., radio) regions are provided, so that in the event that an update fails, after some specifiable number of retries, the backup of the original image partition contents can be restored and the installation aborted (i.e., roll-back recovery).

The update application tracks install progress, recovers where it left off in the event of an unexpected interruption, and backs up (and potentially restores) the NK/kernel and reserved regions. The update application updates RAMIMAGE, ROMIMAGE, IMGFS, and Reserved images. RAMIMAGE and ROMIMAGE partitions are generated in the same way that the desktop disk image tool generates the partitions, that is, the IMGFS partition is updated by working with the existing layout and making calls to IMGFS and the allocator to arrange updated modules properly, both virtually and physically. A reserved update, described above with reference to FIG. 10, is made by overwriting the entire region.

In one implementation, when the update application begins, it assumes that the packages to install are located in a temporary holding directory, as specified in an update application input file in the user store, which contains the input for the update application. The path of the update application input file is specified in the registry. The update application does not care where the packages are stored, whether it is the internal data store or an external storage card, as long as a full path is provided for the holding directory. Also provided is a path to bitmap files that are to be used for the update; note that the normal operating system code is not running and thus bitmaps are provided for user interface purposes (e.g., to show a progress bar, which files are being update, error messages, and the like).

The update application starts by passing the holding directory path to the package validator, which returns a list specifying the order in which to install the packages, as described in the aforementioned related U.S. patent application entitled "Determining the Maximal Set of Dependent Software Updates Valid for Installation." Then, the update loader process iterates through each package and applies the appropriate update, either XIP, IMGFS, and/or Reserved, as described above with reference to FIG. 6.

The update application can be considered as having several processes/components, including an NK/XIP Update process that is responsible for updates to the NK/XIP partition. The image in this partition can be either a ROMIMAGE or a RAMIMAGE (wherein a ROMIMAGE is an image that executes directly from flash and requires NOR Flash, whereas a RAMIMAGE is an image that is loaded into RAM and may be stored either on NOR or NAND flash). Regardless of the image type, region updates interface directly with the block driver when reading and writing.

Another process/component of image update is IMGFS Update, which is responsible for updates to the operating system partition, as managed by the Image File System (IMGFS). The reserved Update process is responsible for updates to the radio or other reserved regions. Reserved region updates will interface directly with the block driver when reading and writing.

Romimage is a shared component (with the desktop Disk Image Tool that provides the initial installation image when a device is manufactured, and is responsible for virtual and physical (storage) allocation and for module fixups. Romimage.dll contains the Allocator class hierarchy and functionality for creating and managing multiple Allocators, the File class hierarchy (used to store metadata about a file or module) and functionality for creating and managing lists of files, and functions to support the updating and building process. A Patchbin component provides the process that applies a bindiff update to generate a new file. The old module data and the bindiff data are provided as inputs to this component, and the output is the data for the new module. A UI Component may be provided to display the appropriate user interface data during the update process. Note that the visual content may be pre-generated based on operating system locale settings.

The NK/XIP update process may be a function called by the update application's main function, which will take a list of NK/XIP packages to apply. An update to the NK/XIP partition requires the update application to re-make the image entirely (effectively the disk image tool process on the device). During an NK/XIP update, an old file list and a new file list is maintained. The old file list is initialized with the current modules in the NK/XIP partition, and that information is used in combination with the packages to create a new file list as the end result. The new file list will contain of the information needed to create an image (headers, section data, flags, and so forth) and that list is passed to the virtual and physical allocator to redo the allocation process.

FIGS. 7A and 7B, described above, show how the kernel region is updated. To summarize the steps of FIGS. 7A and 7B, the process reads the entire XIP (or other) region into RAM and backs it up as a compressed file in user store, scans the existing modules in XIP region to read headers and other metadata and builds unfixed-up versions of the updated modules and files. The process then adds the rest of the modules and the files not being modified to new module list, performs virtual/physical allocation and module fixup and writes the new XIP image back to flash.

The fail-safe methods in this step are fairly straightforward, since nothing is being committed to flash until the end of the process. Therefore, if a power failure were to occur before the new image was written, the process only needs to be redone. If a power failure occurs while writing the new image out, the backup copy of the old image exists, and that is used in recovering the image (if the log file specifies that the new image was in the process of being written out, the compressed backup file is used to restore the copy of the old image). A log file records the steps in the transaction, making it straightforward to know where the process failed.

What is claimed is:

1. In a computing device, the computing device including a processor and system memory, a method implemented by the computing device for performing an update to a storage partition, the method comprising:
 receiving update data to apply to a plurality of components in a file-system image, the file-system image partitioned into a plurality of partitions;
 validating the received update data;
 determining whether to boot the device into an operating system mode or into an update mode;
 booting the device into the update mode;
 in response to booting the device into the update mode, the processor updating a selected partition by separately updating the plurality of components in the file-system image, wherein separately updating the plurality of components comprises applying update data to each component in the plurality of components, wherein the selected partition is selected from among the plurality of partitions;
 in response to a successful update of the plurality of components in the file-system image, committing the resulting update to a system partition; and
 in response to an unsuccessful update of the plurality of components in the file-system image, re-validating the received update data.

2. The method of claim 1 wherein determining whether to boot the device into an operating system mode or into an update mode comprising checking a flag that is set prior to a reboot.

3. The method of claim 1 wherein the updating comprises applying a binary difference file to an existing component.

4. The method of claim 3 wherein applying a binary difference file to an existing component comprises applying a subset of the binary difference file to a subset of the existing component.

5. The method of claim 4 wherein the subset comprises a block of data having a defined size.

6. A computer program product for use at a computing device, the computer program product comprising one or more computer-readable storage media having stored thereon computer-executable instructions which, when executed by a processor, cause the computing device to perform a method comprising:
 receiving update data to apply to a plurality of components in a file-system image;
 validating the received update data;
 checking a flag at boot time to determine whether to boot the device into an operating system mode or into an update mode;
 booting the device into the update mode;
 in response to booting the device into the update mode, performing at least one update to the file-system image, wherein the file-system image is partitioned into at least two partitions including a system partition associated with the file-system image and a kernel partition,
 wherein performing at least one update to the file-system image comprises applying the update data to the plurality of components of the file-system image;
 in response to a successful update of the plurality of components of the file-system image, committing the resulting update to the system partition; and
 in response to an unsuccessful update of the plurality of components of the file-system image, re-validating the received update data and attempting to perform the at least one update to the file-system image using the newly validated update data.

7. In a computing device, the computing device including a processor and system memory, a method implemented by the computing device, the method comprising:
 the processor breaking an operating system image into separate updateable partitions comprising a kernel partition and a system partition; and
 updating at least the kernel partition in isolation with respect to another partition by building a replacement image for the kernel partition and writing the replacement image over an existing image in the kernel partition, and updating the system partition with an update procedure that includes applying update data to a plurality of components of the system partition and validating the resulting updated components, wherein if the components are successfully validated they are committed to the system partition.

8. The method of claim 7 wherein updating the kernel partition comprises booting a computing device into an update mode.

9. The method of claim 7 further comprising backing up the existing image in the kernel partition to a backup image, determining if writing the replacement image successfully completed, and if not, restoring the image from the backup image.

10. The method of claim 9 wherein backing up the existing image includes storing the backup image in a compressed form.

11. The method of claim 7 wherein updating the system partition comprises logging the identity of each updated component to a log file, such that if a failure occurs, the log file may be accessed to determine at which component update the failure occurred.

12. The method of claim 7 wherein updating the system partition comprises applying a binary difference file to an existing component.

13. The method of claim 12 wherein applying a binary difference file to an existing component comprises applying a subset of the binary difference file to a subset of the existing component.

14. The method of claim 13 wherein the subset comprises a block of data having a defined size.

15. The method of claim 7 wherein updating the system partition comprises simulating an update process, and determining that the simulation succeeded before committing updates to the second partition.

16. A computer program product for use at a computing device, the computing device comprising one or more computer-readable storage media having stored thereon computer-executable instructions which, when executed by a processor, cause the computing device to perform a method comprising:
   breaking an operating system image into separate updateable partitions comprising an kernel partition and a system partition; and
   updating at least the kernel partition in isolation with respect to the system partition by building a replacement image for a kernel partition and writing the replacement image over an existing image in the kernel partition, and updating the system partition with an update procedure that includes updating components of an image file system associated with the system partition and simulating an update process before committing updates the resulting updates to the second partition wherein simulating the update process comprises calculating a checksum for the replacement updates and verifying the resultant checksum against a known checksum for a properly built replacement component.

17. In a computing device, the computing device including a processor and system memory, a system comprising:
   a boot mechanism for the processor to boot the computing device; and
   an update loader to which the boot mechanism boots upon detection of a pending update, the update loader comprising the only entity in the device code having write access to protected storage of the device, the protected storage containing at least two partitions comprising a kernel partition and a system partition, wherein the update loader separately updates each partition by building a replacement image for a kernel partition and writing the replacement image over an existing image in the kernel partition, and updates the system partition with an update procedure that includes building a replacement image for the system partition and simulating an update process before committing updates to the system partition, wherein simulating the update process comprises calculating a checksum for the replacement image and verifying the resultant checksum against a known checksum for a properly built replacement image.

18. The system of claim 17 further comprising a validation process, wherein prior to booting to the update loader, the validation process validates at least one update package, and if at least one update package is valid, the validation process queues each valid package for update and sets a mechanism for the boot mechanism to detect the pending update.

19. The system of claim 18 wherein the validation process validates at least one update package by checking that each package is properly signed.

20. The system of claim 18 wherein the validation process validates at least one update package by checking that each package is properly constructed.

21. The system of claim 17 wherein the boot mechanism boots the device into the update mode based on the value of a flag that was set prior to a reboot.

22. The system of claim 17 wherein the update loader backs up the existing image in the system partition to a backup image for restoring to the system partition if the replacement image is not successfully written to the system partition.

23. The system of claim 22 wherein the update loader backs up the existing image in a compressed form.

24. The system of claim 17 wherein the update loader updates the system partition by applying a binary difference file to an existing component.

25. The system of claim 24 wherein the update loader applies the binary difference file by applying a subset of the binary difference file to a subset of the existing component.

* * * * *